(12) United States Patent
Christensen et al.

(10) Patent No.: US 10,150,413 B2
(45) Date of Patent: Dec. 11, 2018

(54) VEHICLE INTERSECTION WARNING SYSTEM AND METHOD WITH FALSE ALARM SUPPRESSION

(71) Applicant: Nissan North America, Inc., Franklin, TN (US)

(72) Inventors: Andrew Christensen, South Lyon, MI (US); Roy Goudy, Farmington Hills, MI (US); Neal Probert, Farmington Hills, MI (US); Jeremy Chambers, Casco, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/458,595

(22) Filed: Mar. 14, 2017

(65) Prior Publication Data

US 2017/0182940 A1   Jun. 29, 2017

Related U.S. Application Data

(63) Continuation of application No. 14/795,244, filed on Jul. 9, 2015, now Pat. No. 9,598,009.

(51) Int. Cl.
*B60Q 9/00* (2006.01)
*G08G 1/16* (2006.01)

(52) U.S. Cl.
CPC ............. *B60Q 9/008* (2013.01); *G08G 1/163* (2013.01)

(58) Field of Classification Search
CPC ..................................................... B60Q 9/008
See application file for complete search history.

(56) References Cited

U.S. PATENT DOCUMENTS

| 4,667,334 A | 5/1987 | Collec et al. |
| 5,493,302 A | 2/1996 | Woll et al. |
| (Continued) | | |

FOREIGN PATENT DOCUMENTS

| JP | 2001118199 A | 4/2001 |
| JP | 2003051099 A | 2/2003 |

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of The Ohio State University, Mar. 2012, UMI/Proquest Pub. No. 3497707, 136 pages (total).

(Continued)

*Primary Examiner* — Erin F Heard
(74) *Attorney, Agent, or Firm* — Young Basile Hanlon & MacFarlane, P.C.

(57) ABSTRACT

A method for providing information to a driver of a vehicle includes obtaining host vehicle information that describes a first path to be traversed by a host vehicle, obtaining conflicting vehicle information that describes a second path to be traversed by a potentially conflicting vehicle, wherein the second path crosses the first path, determining a queue length representing a number of queued vehicles that are queued ahead of the host vehicle, determining a time-to-contact based on the host vehicle information and the conflicting vehicle information, and causing a warning alert to be output if the time-to-contact is less than a warning alert time value and the queue length is equal to or less than a warning alert length value.

20 Claims, 18 Drawing Sheets

(56) References Cited

U.S. PATENT DOCUMENTS

| | | |
|---|---|---|
| 5,640,323 A | 6/1997 | Kleimenhagen et al. |
| 5,939,976 A | 8/1999 | Sasaki et al. |
| 5,940,010 A | 8/1999 | Sasaki et al. |
| 6,008,741 A | 12/1999 | Shinagawa et al. |
| 6,049,269 A | 4/2000 | Byrd et al. |
| 6,223,117 B1 | 4/2001 | Labuhn et al. |
| 6,236,337 B1 | 5/2001 | Beier et al. |
| 6,289,332 B2 | 9/2001 | Menig et al. |
| 6,529,831 B1 | 3/2003 | Smith et al. |
| 6,567,035 B1 | 5/2003 | Elliott |
| 6,603,406 B2 | 8/2003 | Jambhekar et al. |
| 6,615,137 B2 | 9/2003 | Lutter et al. |
| 6,700,504 B1 | 3/2004 | Aslandogan et al. |
| 6,720,898 B1 | 4/2004 | Ostrem |
| 6,759,942 B2 | 7/2004 | Bedi et al. |
| 6,791,471 B2 | 9/2004 | Wehner et al. |
| 6,810,328 B2 | 10/2004 | Yokota et al. |
| 6,985,089 B2 | 1/2006 | Liu et al. |
| 7,188,026 B2 | 3/2007 | Tzamaloukas |
| 7,190,260 B2 | 3/2007 | Rast |
| 7,295,925 B2 | 11/2007 | Breed et al. |
| 7,418,346 B2 | 8/2008 | Breed et al. |
| 7,835,396 B2 | 11/2010 | Nagura |
| 7,991,551 B2 | 8/2011 | Samuel et al. |
| 7,994,902 B2 | 8/2011 | Avery et al. |
| 8,000,897 B2 | 8/2011 | Breed et al. |
| 8,169,338 B2 | 5/2012 | Mudalige |
| 8,175,796 B1 | 5/2012 | Blackburn et al. |
| 8,229,350 B2 | 7/2012 | Smith, Jr. et al. |
| 8,229,663 B2 | 7/2012 | Zeng et al. |
| 8,314,718 B2 | 11/2012 | Muthaiah et al. |
| 8,340,894 B2 | 12/2012 | Yester |
| 8,451,732 B2 | 5/2013 | Nagura |
| 8,466,807 B2 | 6/2013 | Mudalige |
| 8,499,155 B2 | 7/2013 | Kherani et al. |
| 8,520,695 B1 | 8/2013 | Rubin et al. |
| 8,548,729 B2 | 10/2013 | Mizuguchi |
| 8,577,550 B2 | 11/2013 | Lu et al. |
| 8,587,418 B2 | 11/2013 | Mochizuki et al. |
| 8,639,426 B2 | 1/2014 | Dedes et al. |
| 8,648,709 B2 | 2/2014 | Gauger et al. |
| 8,675,603 B2 | 3/2014 | Lee et al. |
| 8,717,192 B2 | 5/2014 | Durekovic et al. |
| 8,848,608 B1 | 9/2014 | Addepalli et al. |
| 8,948,044 B2 | 2/2015 | Bansal et al. |
| 9,173,156 B2 | 10/2015 | Bai et al. |
| 9,214,086 B1 | 12/2015 | Onishi |
| 9,227,595 B2 | 1/2016 | Yang et al. |
| 9,229,088 B2 | 1/2016 | Cheng et al. |
| 9,241,249 B2 | 1/2016 | Yang et al. |
| 9,251,630 B2 | 2/2016 | Denny et al. |
| 9,297,891 B2 | 3/2016 | Karl |
| 9,297,892 B2 | 3/2016 | Smith et al. |
| 9,392,486 B2 | 7/2016 | Bai et al. |
| 9,449,515 B2 | 9/2016 | Rubin et al. |
| 9,619,996 B1 * | 4/2017 | Smith ..................... A62C 3/00 |
| 2001/0044697 A1 | 11/2001 | Kageyama |
| 2002/0134602 A1 | 9/2002 | Kobayashi et al. |
| 2002/0143457 A1 | 10/2002 | Hellmann et al. |
| 2002/0198632 A1 | 12/2002 | Breed et al. |
| 2005/0134440 A1 * | 6/2005 | Breed .................. B60N 2/2863 340/435 |
| 2006/0015231 A1 | 1/2006 | Yoshimura et al. |
| 2006/0052909 A1 | 3/2006 | Cherouny |
| 2007/0050130 A1 | 3/2007 | Grimm et al. |
| 2007/0109111 A1 | 5/2007 | Breed et al. |
| 2007/0262881 A1 | 11/2007 | Taylor |
| 2007/0276574 A1 | 11/2007 | Isaji et al. |
| 2008/0037577 A1 | 2/2008 | Nagura |
| 2008/0272898 A1 | 11/2008 | Irion et al. |
| 2008/0275618 A1 | 11/2008 | Grimm et al. |
| 2009/0033540 A1 | 2/2009 | Breed et al. |
| 2009/0140887 A1 | 6/2009 | Breed et al. |
| 2009/0198412 A1 | 8/2009 | Shiraki |
| 2010/0019891 A1 | 1/2010 | Mudalige |
| 2010/0094509 A1 * | 4/2010 | Luke ..................... B60W 40/02 701/45 |
| 2010/0169009 A1 | 7/2010 | Breed et al. |
| 2010/0198513 A1 | 8/2010 | Zeng et al. |
| 2010/0248618 A1 | 9/2010 | Bai et al. |
| 2011/0080302 A1 | 4/2011 | Muthaiah et al. |
| 2011/0087433 A1 | 4/2011 | Yester |
| 2011/0128902 A1 | 6/2011 | Guo |
| 2011/0238259 A1 | 9/2011 | Bai et al. |
| 2012/0016581 A1 | 1/2012 | Mochizuki et al. |
| 2012/0025965 A1 | 2/2012 | Mochizuki et al. |
| 2012/0215381 A1 | 8/2012 | Wang et al. |
| 2012/0218093 A1 | 8/2012 | Yoshizawa et al. |
| 2012/0310480 A1 | 12/2012 | Schmidt |
| 2013/0015984 A1 | 1/2013 | Yamashiro |
| 2013/0099911 A1 | 4/2013 | Mudalige et al. |
| 2013/0116915 A1 | 5/2013 | Ferreira et al. |
| 2013/0154853 A1 | 6/2013 | Chen |
| 2013/0179047 A1 | 7/2013 | Miller et al. |
| 2013/0278440 A1 | 10/2013 | Rubin et al. |
| 2013/0278441 A1 | 10/2013 | Rubin et al. |
| 2013/0278443 A1 | 10/2013 | Rubin et al. |
| 2013/0279491 A1 | 10/2013 | Rubin et al. |
| 2013/0282277 A1 | 10/2013 | Rubin et al. |
| 2013/0297195 A1 | 11/2013 | Das et al. |
| 2014/0032049 A1 | 1/2014 | Moshchuk et al. |
| 2014/0136044 A1 | 5/2014 | Conrad |
| 2014/0307628 A1 | 10/2014 | Stahlin et al. |
| 2014/0347486 A1 * | 11/2014 | Okouneva ................. B60R 1/00 348/148 |
| 2015/0078291 A1 | 3/2015 | Guner |
| 2015/0197248 A1 * | 7/2015 | Breed ................ G08G 1/09626 701/93 |
| 2015/0200957 A1 | 7/2015 | Zhang et al. |
| 2015/0348412 A1 | 12/2015 | Onishi |
| 2016/0225254 A1 * | 8/2016 | Durekovic ............ G08G 1/161 |
| 2017/0372612 A1 * | 12/2017 | Bai ........................ G08G 1/161 |

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

\* cited by examiner

VEHICLE INTERSECTION WARNING SYSTEM AND METHOD WITH FALSE ALARM SUPPRESSION

CROSS-REFERENCE TO RELATED APPLICATIONS

This application is a continuation of U.S. patent application Ser. No. 14/795,244, which was filed on Jul. 9, 2015, now U.S. Pat. No. 9,598,009.

TECHNICAL FIELD

This disclosure relates to the field of vehicle warning systems.

BACKGROUND

Computerization of certain aspects of vehicles has led to a shift from completely manual control of vehicles to vehicles in which drivers are provided with varying levels of assistance. Some systems are passive in nature. In a passive system, a condition is detected, and the driver is warned of the condition. Other systems are active in nature. In an active system, a condition is detected, and the vehicle assumes control of a certain system or modifies the control inputs made by the driver.

Some driver assistance systems are intended to warn drivers as to potential collisions. Collision warning systems that are currently in wide use rely on detection and ranging systems that utilize technologies such as Sonar, Radar, and Lidar. The signals generated by the detection and ranging system are used as a basis for determining whether a collision is imminent. While these systems work well for stationary objects, they can be largely inadequate for vehicle collision avoidance, as they require line of sight to the other vehicle, and cannot make a determination of driver intent.

Some current research and development efforts are directed to collision warning systems that are based on vehicle-to-vehicle (V2V) communications. Since V2V communication does not require line of sight, it provides a distinct advantage over detection and ranging systems. One example of V2V communication is a system in which vehicles exchange a basic safety message or "BSM." The BSM that is broadcast by a vehicle can contain a number of data elements that describe various aspects of the operation of the vehicle or provide information about the vehicle itself. As one example, the BSM can include location and trajectory information. As another example, the BSM can include information that describes the vehicle type and size for the vehicle.

Some of these systems use the BSM information to determine actual vehicle locations relative to a map, and then use this information to determine whether a collision is possible. Other systems use the BSM information to determine the relative positions and relative trajectories of two vehicles, and then use this information to determine whether a collision is possible.

SUMMARY

Vehicle intersection warning systems and methods with false alarm suppression are disclosed herein.

One aspect of the disclosure is a method for providing information to a driver of a vehicle. The method includes obtaining host vehicle information that describes a first path to be traversed by a host vehicle, obtaining conflicting vehicle information that describes a second path to be traversed by a potentially conflicting vehicle, wherein the second path crosses the first path, determining a queue length representing a number of queued vehicles that are queued ahead of the host vehicle, determining a time-to-contact based on the host vehicle information and the conflicting vehicle information, and causing a warning alert to be output if the time-to-contact is less than a warning alert time value and the queue length is equal to or less than a warning alert length value.

Another aspect of the disclosure is a system that includes a wireless electronic communication device that is located in a host vehicle, one or more sensors that are located in the host vehicle, an output system that is located in the host vehicle and includes at least one of an audio output device or a visual output device, an information system that is located in the host vehicle and is operable to execute instructions. The instructions, when executed by the information system, cause the information system to obtain host vehicle information from the one or more sensors, wherein the host vehicle information describes a first path to be traversed by the host vehicle, obtain conflicting vehicle information that describes a second path to be traversed by a potentially conflicting vehicle, wherein the second path crosses the first path, determine a queue length representing a number of queued vehicles that are queued ahead of the host vehicle, determine a time-to-contact based on the host vehicle information and the conflicting vehicle information, and cause a warning alert to be output using the output system if the time-to-contact is less than a warning alert time value and the queue length is equal to or less than a warning alert length value.

Another aspect of the disclosure is a system that includes a host vehicle. The host vehicle includes a wireless electronic communication device, one or more sensors that output host vehicle information, an output system that includes at least one of an audio output device or a visual output device, and an information system that is operable to execute instructions. The instructions, when executed by the information system, cause the information system to determine, based on the host vehicle information, that the host vehicle is waiting to follow a first path through a roadway intersection, determine, based on remote vehicle information obtained from remote vehicles, that a potentially conflicting vehicle will cross the first path, determine a time-to-contact representing an amount of time until the potentially conflicting vehicle crosses the first path, and cause a warning alert to be output using the output system if the time-to-contact is less than a warning alert time value and only if zero vehicles are queued ahead of the host vehicle.

BRIEF DESCRIPTION OF THE DRAWINGS

The various aspects of the methods and apparatuses disclosed herein will become more apparent by referring to the examples provided in the following description and drawings in which.

DETAILED DESCRIPTION

A vehicle warning system may output an alert such as a warning alert or an informative alert at an intersection when an oncoming car is detected but presents no actual possibility of collision. This is referred to as a "false alarm." False alarms reduce the efficacy of a vehicle warning system because users may not pay attention to alerts if the system produces a significant number of false alarms.

One situation in which false alarms arise is when the host vehicle is in a queue of vehicles at an intersection. If the host vehicle is at the front of the queue, the driver is able to enter the intersection. Accordingly, alerts as to potentially conflicting vehicles are relevant to the host vehicle. If the host vehicle is not at the front of the queue, but there is instead a queue of one or more vehicles ahead of the host vehicle, the driver is not able to enter the intersection. In this situation, the driver might consider an alert as to potentially conflicting vehicles a false alarm.

The systems and methods described herein utilize information describing the locations and headings of other vehicles to determine whether the host vehicle is in a queue of one or more vehicles in addition to the host vehicle. If the host vehicle is located in a queue, an alert that would otherwise be output by the warning system can be suppressed.

Figure 1:
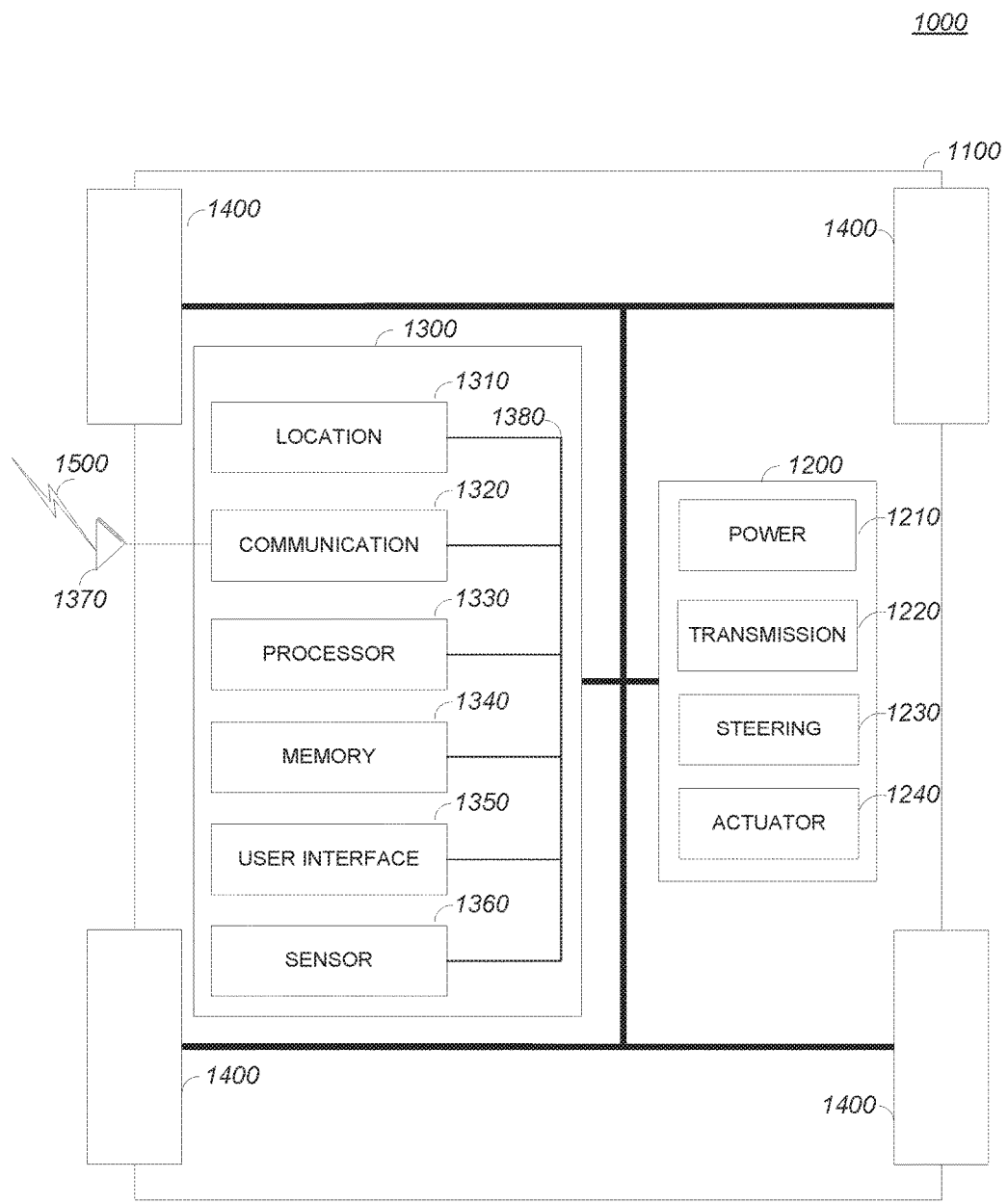
FIG. 1 is a diagram of an example of a vehicle.

FIG. 1 is a diagram of an example of a vehicle in which the aspects, features, and elements disclosed herein may be implemented. In some embodiments, a vehicle 1000 may include a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information nowexisting or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively couple with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless medium 1500, such as via the communication interface 1370. Although not explicitly shown in FIG. 1, the communication unit 1320 may be configured to transmit, receive, or both via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used. In some embodiments, the communication unit 1320 may include a dedicated short range communications (DSRC) unit, a wireless safety unit (WSU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch based communication with the person.

The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
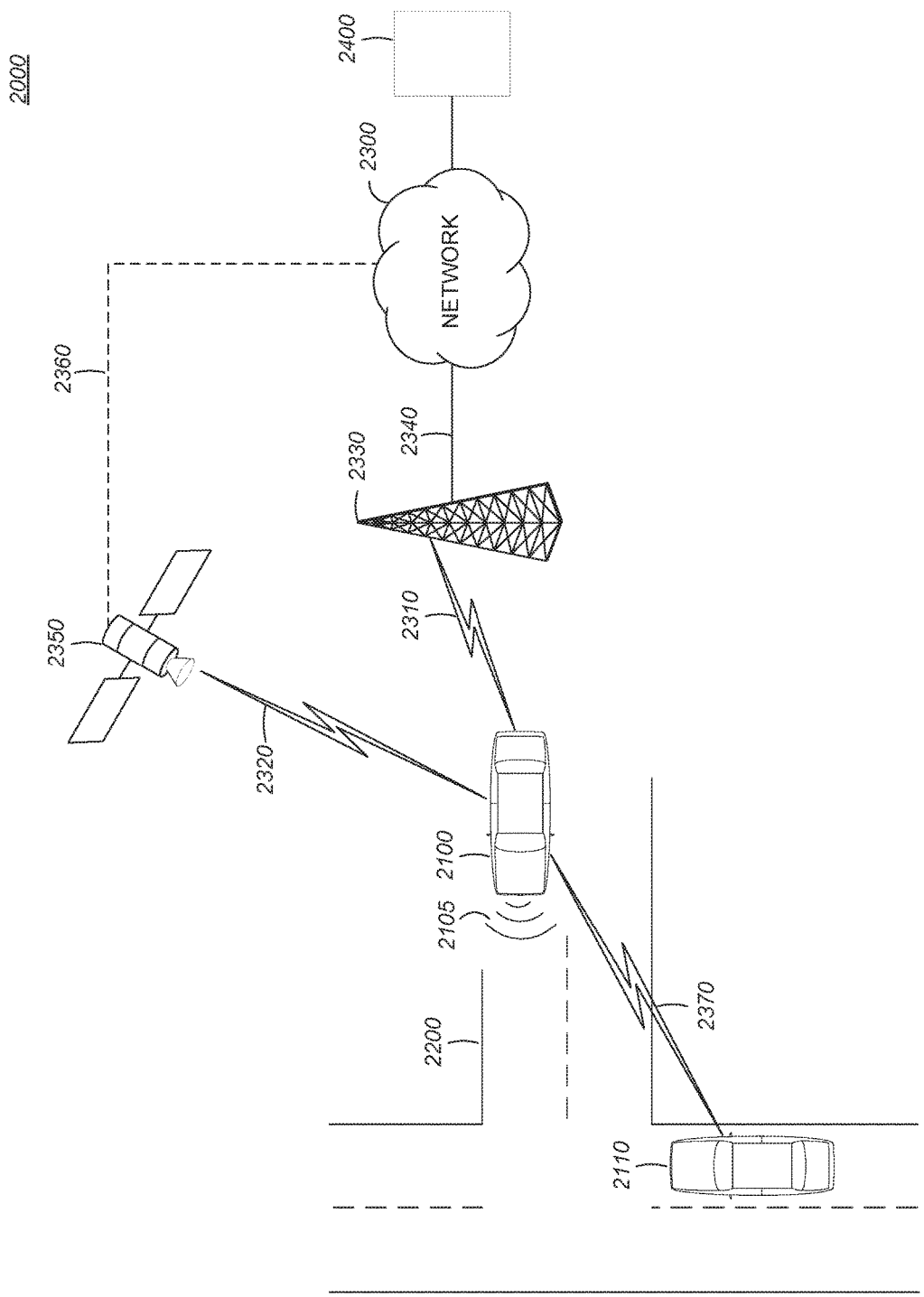
FIG. 2 is a diagram of an example of a portion of a vehicle transportation and communication system.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, a vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). In some embodiments, a vehicle 2100/2110 may transmit one or more automated inter-vehicle messages periodically based on a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

In some embodiments, the vehicle 2100 may communicate with the communications network 2300 via an access point 2330. An access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the vehicle 2100 may communicate with the communications network 2300 via a satellite 2350, or other non-terrestrial communication device. A satellite 2350, which may include a computing device, may be configured to communicate with a vehicle 2100, with a communication network 2300, with one or more communication devices 2400, or with a combination thereof via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, a vehicle 2100 may identify a portion or condition of the vehicle transportation network 2200. For example, the vehicle may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, a vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows one vehicle 2100, one vehicle transportation network 2200, one electronic communication network 2300, and one communication device 2400, any number of vehicles, networks, or computing devices may be used. In some embodiments, the vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

FIGS. 3-14 show examples of diagrams representing vehicles operating in one or more portions of one or more vehicle transportation networks. For simplicity and clarity a host vehicle is shown with stippling and remote vehicles are shown in white. For simplicity and clarity the diagrams shown in FIGS. 3-14 are oriented with north at the top and east at the right side. In some embodiments, a defined geospatial range is shown as approximately 300 meters; however, other ranges may be used.

Figure 3:
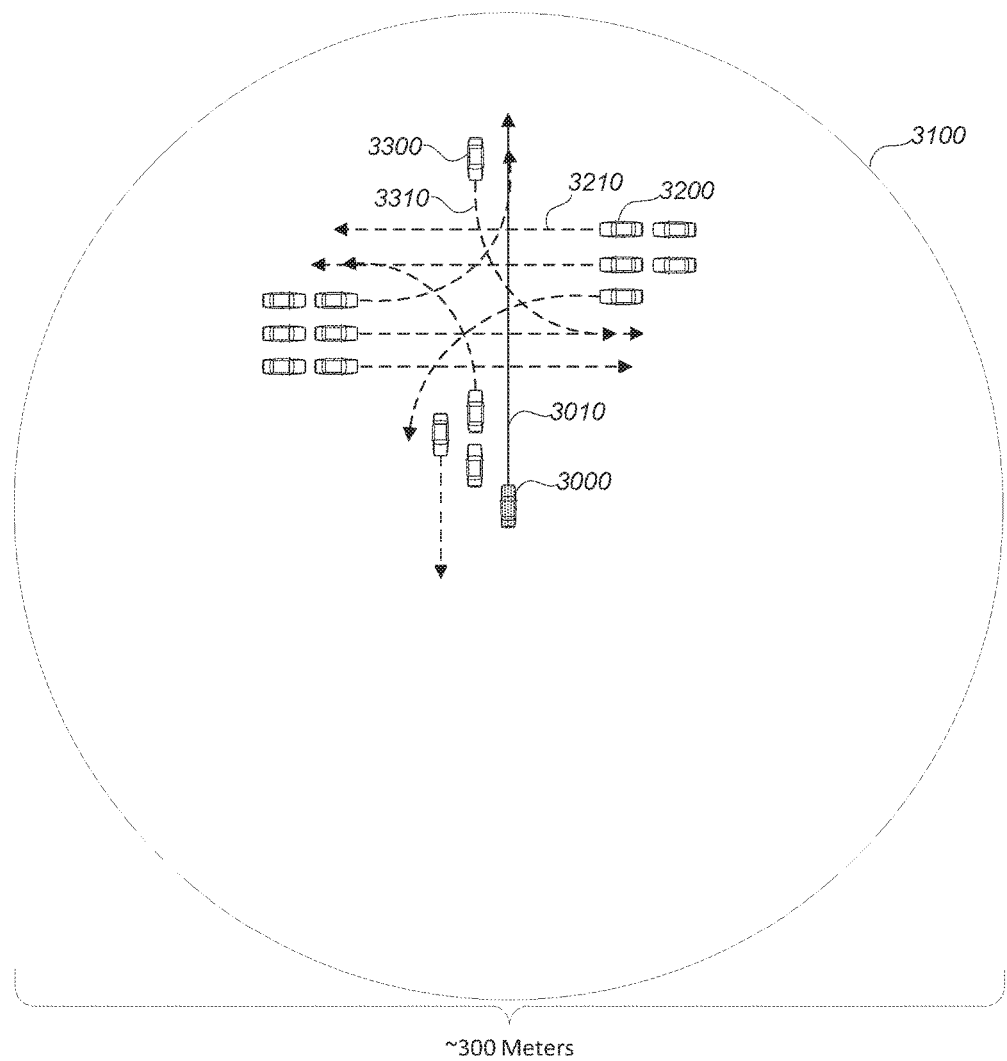
FIG. 3 is a diagram of geospatially locating remote vehicles based on automated inter-vehicle messages.

FIG. 3 is a diagram of geospatially locating remote vehicles based on automated inter-vehicle messages. Geospatially locating remote vehicles based on automated inter-vehicle messages may be implemented in a vehicle, such as the vehicle 1000 shown in FIG. 1 or the vehicles 2100/2110 shown in FIG. 2. In some embodiments, one or more of the vehicles shown in FIG. 3, including the remote vehicles, the host vehicle, or both, may be stationary or may be in motion.

In some embodiments, a host vehicle 3000 may traverse a portion of a vehicle transportation network (not expressly shown), may receive automated inter-vehicle communications from one or more remote vehicles 3100/3200 within a defined geospatial range 3300, and may transmit automated inter-vehicle communications to one or more remote vehicles 3100/3200 within the defined geospatial range 3300. For simplicity and clarity, an automated inter-vehicle communication received by a host vehicle from a remote vehicle may be referred to herein as a remote vehicle message. For example, the host vehicle 3000 may receive the remote vehicle messages via a wireless electronic communication link, such as the direct communication link 2370 shown in FIG. 2.

In some embodiments, the automated inter-vehicle messages may indicate information such as geospatial location information and heading information. In some embodiments, the host vehicle 3000 may transmit one or more automated inter-vehicle messages including host vehicle information, such as host vehicle heading information. For example, as shown in FIG. 3, the host vehicle heading information may indicate that the host vehicle 3000 is heading straight ahead. In some embodiments, a remote vehicle 3100 may transmit one or more automated inter-vehicle messages including remote vehicle information, such as remote vehicle heading information. For example, the remote vehicle heading information may indicate that the remote vehicle 3200 is heading straight west. In another example, a remote vehicle 3100 may transmit one or more automated inter-vehicle messages including remote vehicle information that includes remote vehicle heading information, which may indicate that the remote vehicle 3100 is heading south.

In some embodiments, the host vehicle 3000 may identify a host vehicle expected path 3010 for the host vehicle based on host vehicle information, such as host vehicle geospatial state information and host vehicle kinematic state information. In some embodiments, the host vehicle 3000 may identify a remote vehicle expected path for a remote vehicle based on the automated inter-vehicle messages, which may include remote vehicle information, such as remote vehicle geospatial state information and remote vehicle kinematic state information. For example, the remote vehicle messages transmitted by the remote vehicle 3200 in the upper right of FIG. 3 may indicate that the remote vehicle 3200 is heading west, and the host vehicle 3000 may identify the remote vehicle expected path 3210 for the remote vehicle 3200. In another example, the remote vehicle messages transmitted by the remote vehicle 3100 in the upper left of FIG. 3 may indicate that the remote vehicle 3100 is heading south, and may include navigation information, such as turn signal information indicating a left turn, and the host vehicle 3000 may identify the remote vehicle expected path 3110 for the remote vehicle 3100.

For simplicity and clarity the heading and expected path of the host vehicle 3000 are shown as a solid directional line and the expected paths of respective remote vehicles are shown as directional broken lines. Expected paths are omitted from FIG. 3 for some vehicles for simplicity and clarity.

Figure 4:
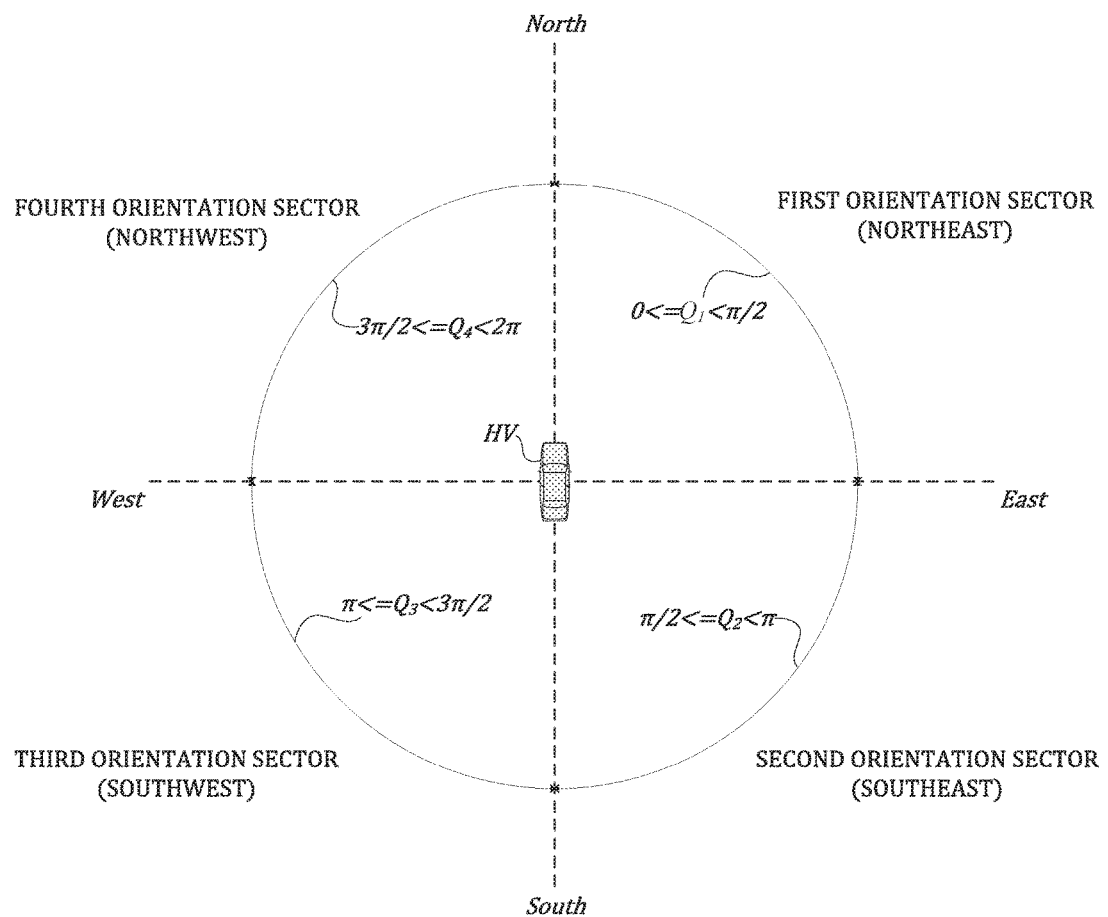
FIG. 4 is a diagram showing orientation sectors.

FIG. 4 is a diagram showing orientation sectors. In some embodiments, geospatial location of remote vehicles can include determining an orientation sector ($Q_n$), which may indicate a quantized geospatial location, or direction, of a remote vehicle, relative to the host vehicle, in the geospatial domain. In some embodiments, locations relative to the host vehicle location may be quantized into a defined number, quantity, count, or cardinality, of orientation sectors (Q). For example, the defined set of orientation sectors (Q) may include four orientation sectors, or quadrants, which may include ninety degrees each. However, any number, size, and direction of orientation sectors may be used. Although the host vehicle is shown in FIG. 4 as heading north, the orientation sector may be identified relative to the host vehicle geospatial location independently of the heading, path, or route of the host vehicle.

In some embodiments, the defined set of orientation sectors may be identified in the geospatial domain relative to the host vehicle and a reference direction, such as north. For simplicity and clarity the angles described herein, such are identified clockwise. For example, relative to the host vehicle, the reference direction, north, may correspond with zero degrees (0°, 360°, 2π), east may correspond with ninety degrees (90°, π2), south may correspond with 180 degrees (180°, π), and west may correspond with 270 degrees (270°, 3π/2).

As shown in FIG. 4, in some embodiments, the orientation sectors (Q) may include a first orientation sector $Q_1$ to the northeast of the host vehicle, which may include locations from zero degrees (0°, 360°, 2π, or north) to ninety degrees (90°, π/2, or east), which may be expressed as $0<=Q_1<\pi/2$. The orientation sectors (Q) may include a second orientation sector $Q_2$ to the southeast of the host vehicle, which may include locations from ninety degrees (90° or π/2) to 180 degrees (180°, π, or south), which may be expressed as $\pi/2<=Q_2<\pi$. The orientation sectors (Q) may include a third orientation sector $Q_3$ to the southwest of the host vehicle, which may include locations from 180 degrees (180° or π) to 270 degrees (270°, 3π/2, or west), which may be expressed as $\pi<=Q_3<3\pi/2$. The orientation sectors (Q) may include a fourth orientation sector $Q_4$ to the northwest of the host vehicle, which may include locations from 270 degrees (270°, 3π/2, or west) to 360 degrees (0°, 360°, 2π, or north), which may be expressed as $3\pi/2<=Q_4<360$.

Figure 5:
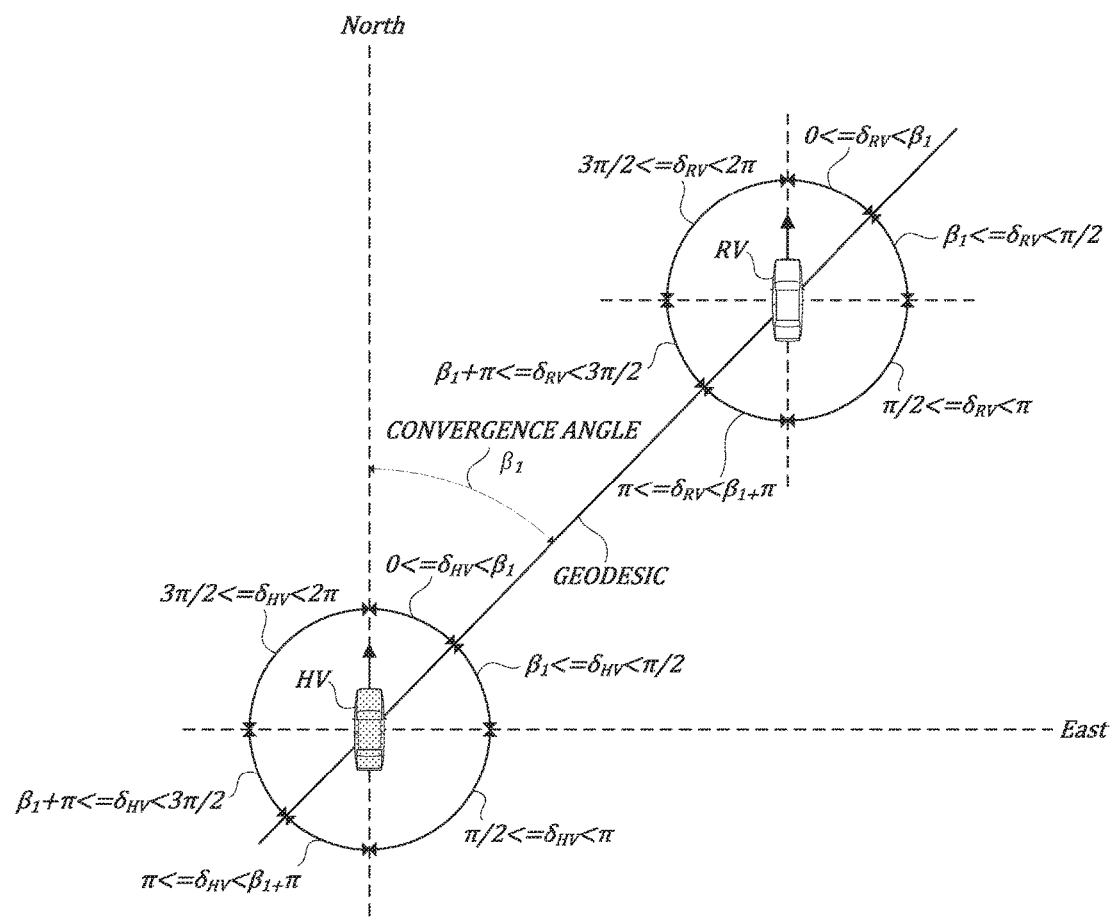
FIG. 5 is a diagram of identifying inter-vehicle state information including a geodesic for a first orientation sector.
Figure 6:
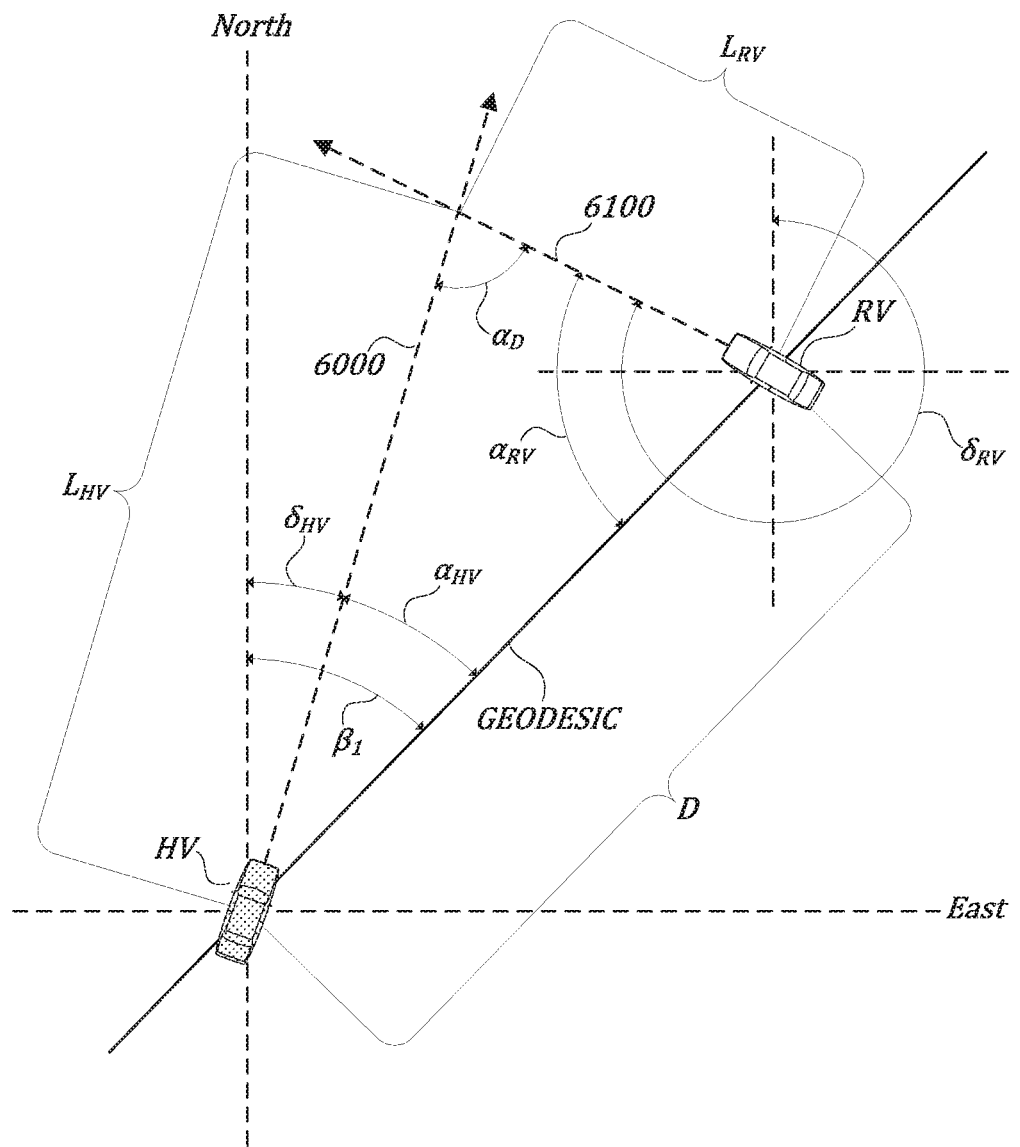
FIG. 6 is a diagram of identifying inter-vehicle state information including convergence information for the first orientation sector.
Figure 7:
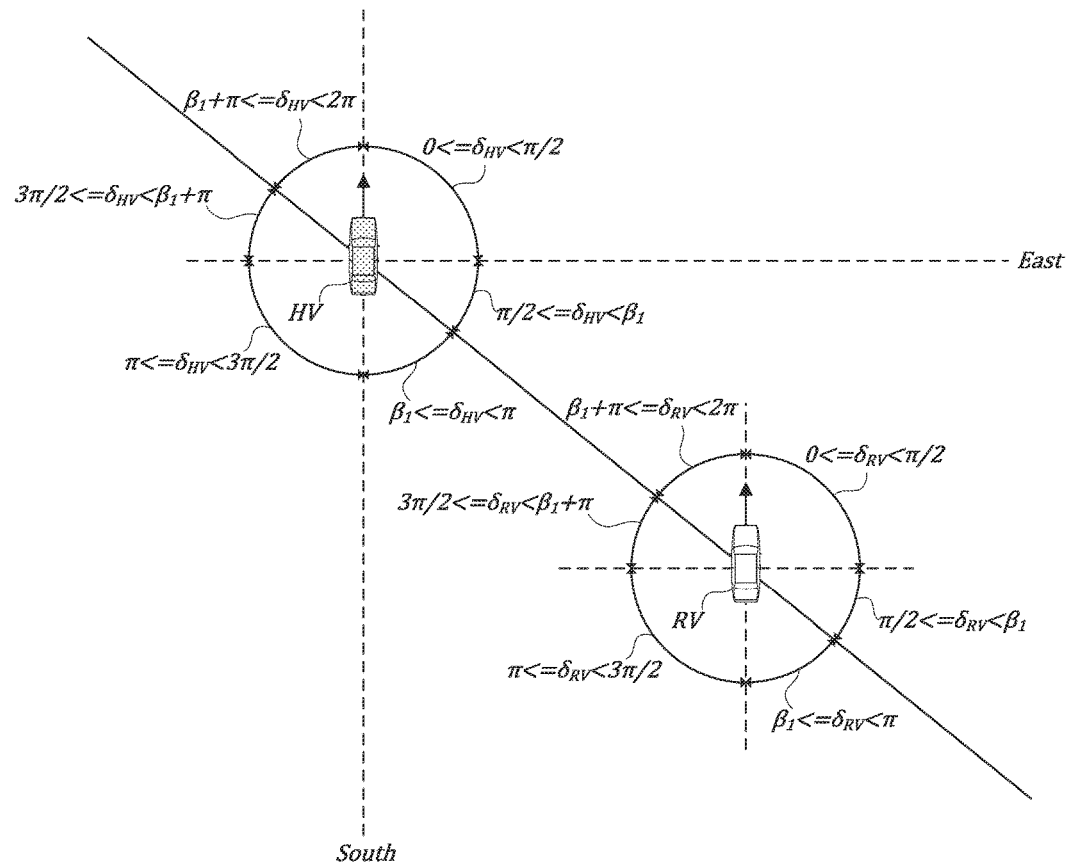
FIG. 7 is a diagram of identifying inter-vehicle state information including a geodesic for a second orientation sector.
Figure 8:
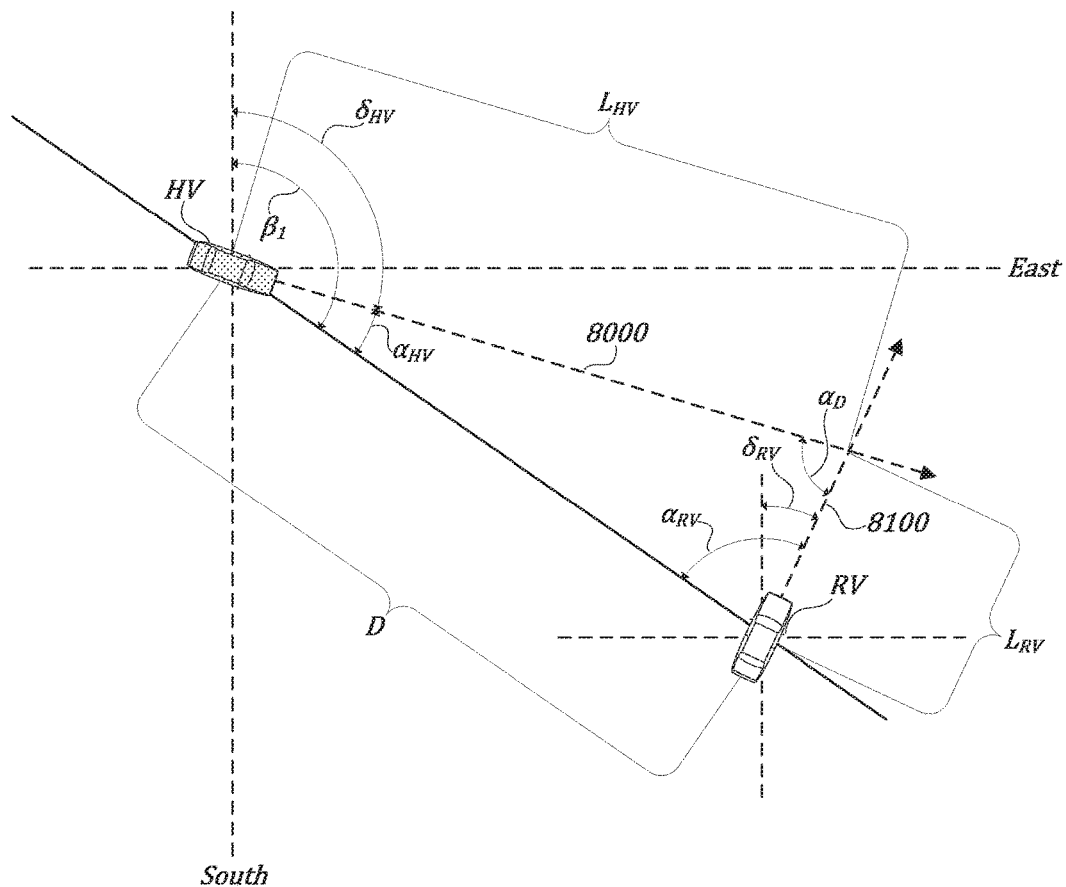
FIG. 8 is a diagram of identifying inter-vehicle state information including convergence information for the second orientation sector.
Figure 9:
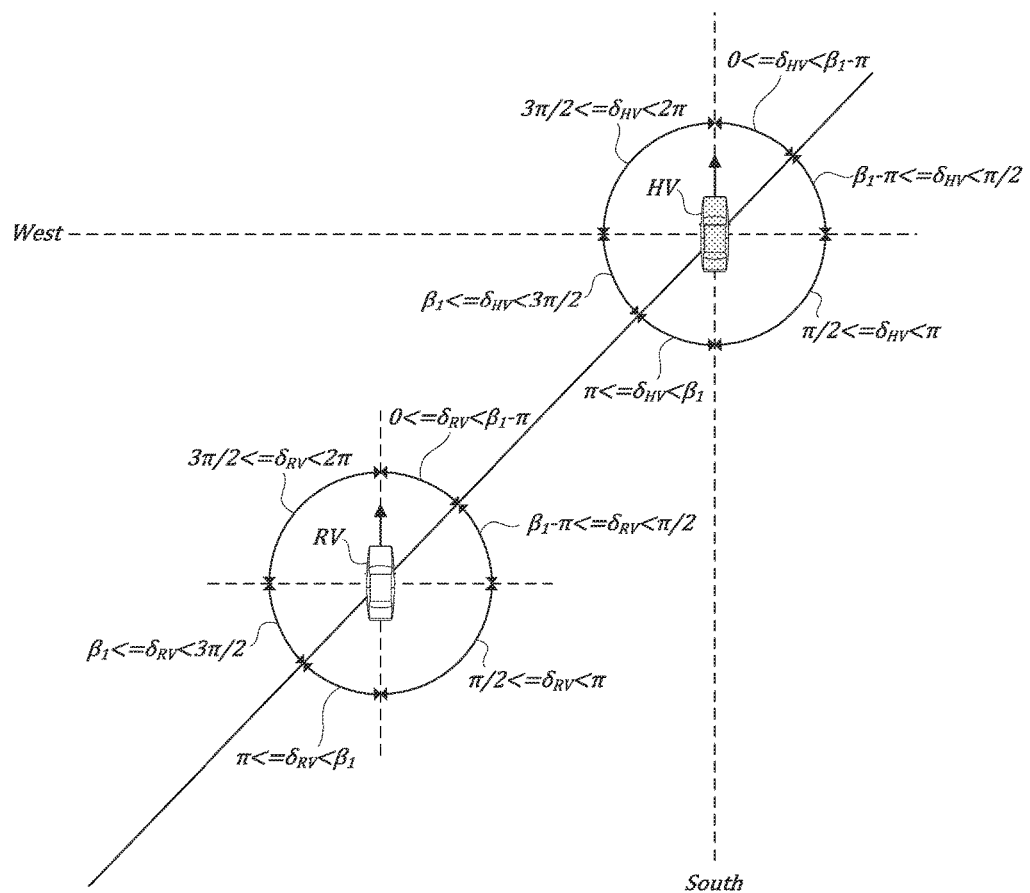
FIG. 9 is a diagram of identifying inter-vehicle state information including a geodesic for a third orientation sector.
Figure 10:
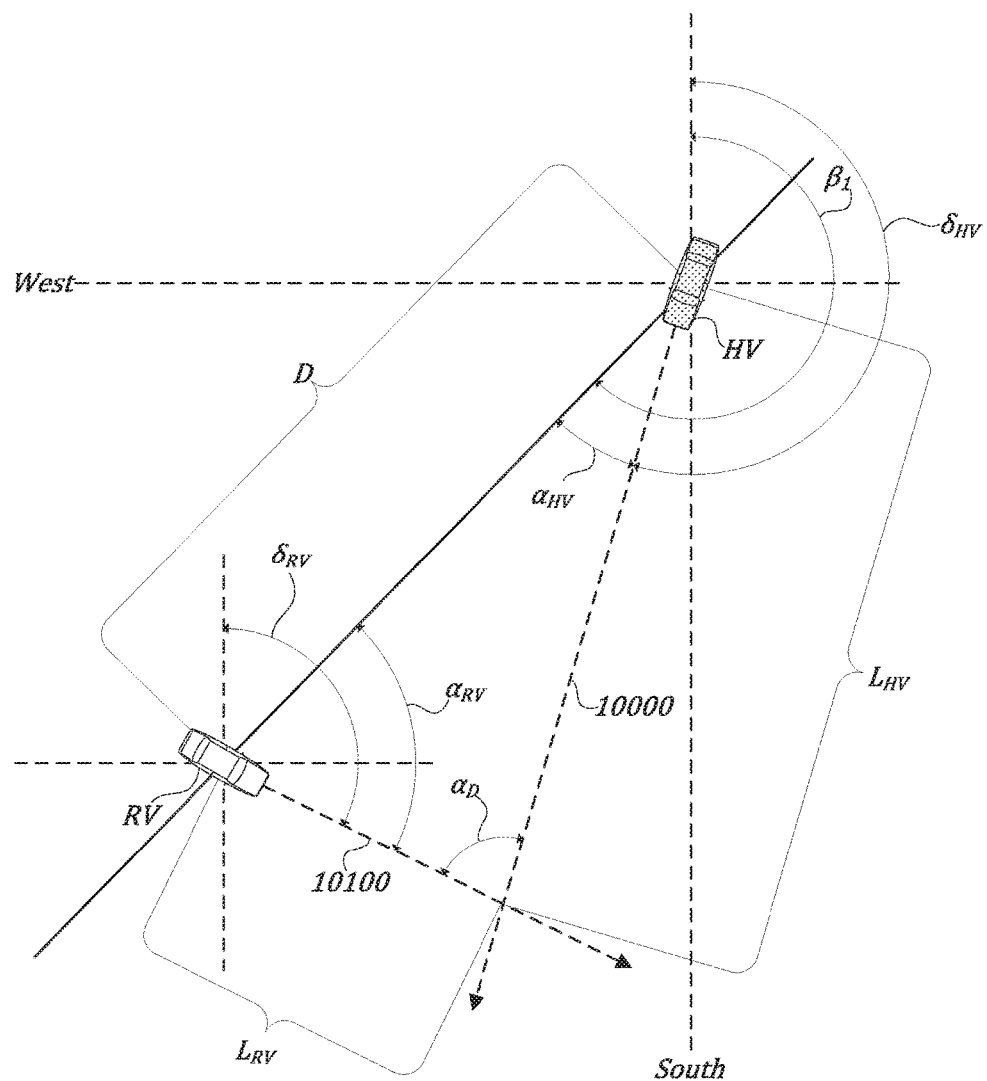
FIG. 10 is a diagram of identifying inter-vehicle state information including convergence information for the third orientation sector.
Figure 11:
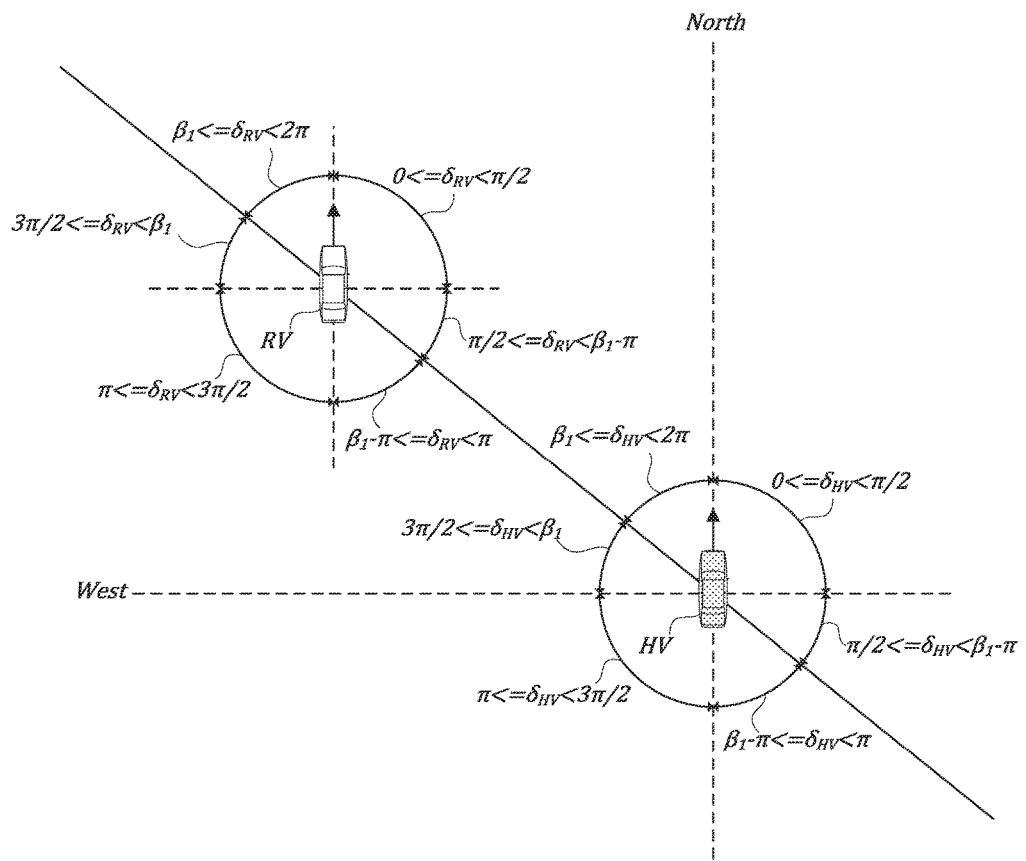
FIG. 11 is a diagram of identifying inter-vehicle state information including a geodesic for a fourth orientation sector.
Figure 12:
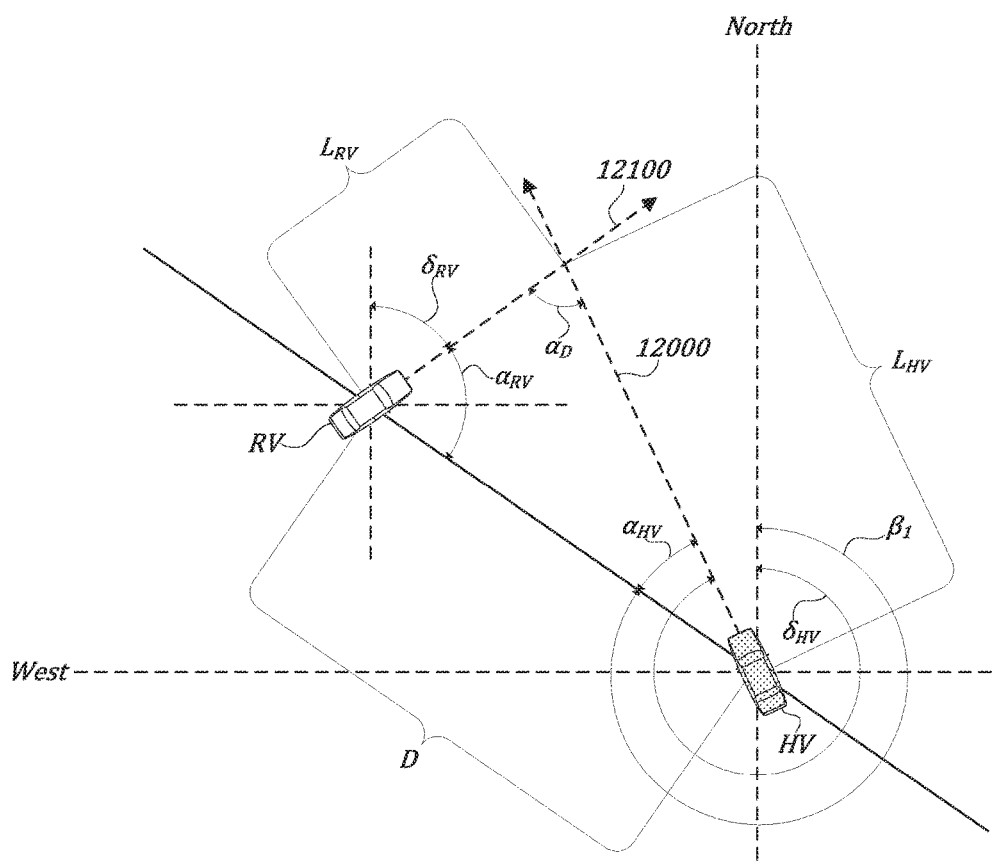
FIG. 12 is a diagram of identifying inter-vehicle state information including convergence information for the fourth orientation sector.

Geospatially locating remote vehicles can include identifying inter-vehicle state information, such as information describing the geospatial position and path of respective remote vehicles relative to the host vehicle location and expected path. Examples using the first orientation sector $Q_1$ are shown in FIGS. 5-6. Examples using the second orientation sector $Q_2$ are shown in FIGS. 7-8. Examples using the third orientation sector $Q_3$ are shown in FIGS. 9-10. Examples using the fourth orientation sector $Q_4$ are shown in FIGS. 11-12.

FIG. 5 is a diagram of identifying inter-vehicle state information including a geodesic for a first orientation sector. Identifying inter-vehicle state information may be implemented in a vehicle, such as the vehicle 1000 shown in FIG. 1 or the vehicles 2100/2110 shown in FIG. 2.

In some implementations, a geodesic between the host vehicle (HV) and a respective remote vehicle (RV) is determined. A geodesic may indicate a geospatially direct line between a host vehicle and a respective remote vehicle, and may be determined relative to the host vehicle in the geospatial domain. The geodesic may be the shortest direct navigable or unnavigable line between the host vehicle and the remote vehicle respective of the curvature of the earth. In FIGS. 5-12 the geodesic is shown as a solid line intersecting with the host vehicle and the remote vehicle. Although the geodesic is shown as extending beyond the vehicle for clarity, the length of the geodesic may correspond with a geospatially direct line distance between the host vehicle and the remote vehicle.

A geodesic can be described by a convergence angle $\beta_1$ for the geodesic. The convergence angle $\beta_1$ indicates an angle between the geodesic and a reference direction relative to the host vehicle in the geospatial domain. In implementations where the reference direction is North, the convergence angle $\beta_1$ is measured between a North-South reference line and the geodesic. For simplicity, in FIG. 5, the vehicles are shown heading north; however, the geodesic and convergence angle $\beta_1$ may be identified independently of vehicle heading. Although described herein with a reference direction of north, other reference directions can be used. For example, in some embodiments, the direction of the geodesic as the reference direction and the convergence angle $\beta_1$ may be zero degrees.

In some embodiments, the geodesic may be determined based on host vehicle information, such as a geospatial location of the host vehicle, remote vehicle information, such as a geospatial location of the remote vehicle, or a combination thereof. For example, the host vehicle information may indicate a longitude ($\theta_{HV}$) for the host vehicle, a latitude ($\phi_{HV}$) for the host vehicle, or both, the remote vehicle information may indicate a longitude ($\theta_{RV}$) for the remote vehicle, a latitude ($\phi_{RV}$) for the remote vehicle, or both, $\sigma$ may indicate a very small value used to avoid dividing by zero, and determining the convergence angle $\beta_1$ may be expressed as the following:

$$\beta_1 = \pi \left[ \frac{\theta_{HV} - \theta_{RV} - \sigma}{|\theta_{HV} - \theta_{RV}| + \sigma} + 1 \right] - \cos^{-1} \qquad \text{[Equation 1]}$$

$$\left( \frac{(\phi_{RV} - \phi_{HV})}{\sqrt{(\theta_{RV} - \theta_{HV})^2 \cos^2\phi_{HV} + (\phi_{RV} - \phi_{HV})^2}} \right)$$

$$\left[ \frac{\theta_{HV} - \theta_{RV} - \sigma}{|\theta_{HV} - \theta_{RV}| + \sigma} \right].$$

In some embodiments, a length of the geodesic, which may correspond to a geospatially direct line distance, or instantaneous distance, D between the host vehicle and the remote vehicle, may be determined based on the host vehicle information, the remote vehicle information, or a combination thereof. For example, f may indicate an earth flattening value, such as f=1/298.257223563, $r_e$ may indicate a measure of the earth's equatorial radius, such as $r_e$=6,378,137 meters, and determining the distance D may be expressed as the following:

$$D = (1-f)r_e \sqrt{\frac{(\theta_{RV} - \theta_{HV})^2 \cos^2\phi_{HV} + (\phi_{RV} - \phi_{HV})^2}{\sin^2\phi_{HV} + (1-f)^2 \cos^2\phi_{HV}}}. \qquad \text{[Equation 2]}$$

As shown in FIG. 4, an orientation sector may be generated and utilized to indicate a geospatial location of a remote vehicle relative to the host vehicle. The orientation sector may correspond with the convergence angle $\beta_1$, which may indicate the location of the geodesic relative to the reference direction and the host vehicle.

A host vehicle region may be used to indicate a quantization of a host vehicle heading angle $\delta_{HV}$. The host vehicle heading angle $\delta_{HV}$ may indicate the host vehicle heading or expected path relative to the host vehicle and the geodesic in the geospatial domain. For example, relative to the orientation sector, directions from the host vehicle may be quantized into a defined cardinality of regions, such as six regions as shown.

For example, for the first orientation sector $Q_1$, the remote vehicle, and the geodesic, is located to the northeast of the host vehicle in the geospatial domain. A first host vehicle region may include host vehicle heading angles $\delta_{HV}$ from the reference direction, which may correspond with north, to the convergence angle $\beta_1$ of the geodesic, which may be expressed as $0 \leq \delta_{HV} < \beta_1$. A second host vehicle region may include host vehicle heading angles $\delta_{HV}$, from the convergence angle $\beta_1$ of the geodesic to ninety degrees, which may correspond with east, and which may be expressed as $\beta_1 \leq \delta_{HV} < \pi/2$. A third host vehicle region may include host vehicle heading angles $\delta_{HV}$ from ninety degrees to 180 degrees, which may correspond with south, and which may be expressed as $\pi/2 \leq \delta_{HV} < \pi$. A fourth host vehicle region may include host vehicle heading angles $\delta_{HV}$ from 180 degrees to the opposite of the convergence angle $\beta_1 + \pi$ of the geodesic, which may be expressed as $\pi \leq \delta_{HV} < \beta_1 + \pi$. A fifth host vehicle region may include host vehicle heading angles $\delta_{HV}$ from the opposite, with respect to the vertical, of the convergence angle $\beta_1 + \pi$ of the geodesic, to 270 degrees, which may correspond with west, and which may be expressed as $\beta_1 + \pi \leq \delta_{HV} < 3\pi/2$. A sixth host vehicle region may include host vehicle heading angles $\delta_{HV}$, from 270 degrees to 360 degrees, which may correspond with the reference direction, north, and which may be expressed as $\beta_1 + \pi \leq \delta_{HV} < 3\pi/2$.

A remote vehicle region for the remote vehicle may be determined to indicate a quantization of a remote vehicle heading angle $\delta_{RV}$. The remote vehicle heading angle $\delta_{RV}$, which may indicate the remote vehicle heading or expected path, relative to the remote vehicle and the geodesic in the geospatial domain, and which may be determined relative to the orientation sector. For example, relative to the orientation sector, directions from the remote vehicle may be quantized into a defined cardinality of regions, such as six regions as shown, which may correspond with the host vehicle regions.

For example, for the first orientation sector $Q_1$, a first remote vehicle region may include remote vehicle heading angles $\delta_{RV}$ from the reference direction, which may correspond with north, to the convergence angle $\beta_1$ of the geodesic, which may be expressed as $0 \leq \delta_{RV} < \beta_1$. A second remote vehicle region may include remote vehicle heading angles $\delta_{RV}$ from the convergence angle $\beta_1$ of the geodesic to ninety degrees, which may correspond with east, and which may be expressed as $\beta_1 <= \delta_{RV} < \pi/2$. A third remote vehicle region may include remote vehicle heading angles $\delta_{RV}$ from ninety degrees to 180 degrees, which may correspond with south, and which may be expressed as $\pi/2 <= \delta_{RV} < \pi$. A fourth remote vehicle region may include remote vehicle heading angles $\delta_{RV}$ from 180 degrees to the opposite of the convergence angle $\beta_1 + \pi$ of the geodesic, which may be expressed as $\pi <= \delta_{RV} < \beta_1 + \pi$. A fifth remote vehicle region may include remote vehicle heading angles $\delta_{RV}$ from the opposite of the convergence angle $\beta_1 + \pi$ of the geodesic, to 270 degrees, which may correspond with west, and which may be expressed as $\beta_1 + \pi <= \delta_{RV} < 3\pi/2$. A sixth remote vehicle region may include remote vehicle heading angles $\delta_{RV}$ from 270 degrees to 360 degrees, which may correspond with the reference direction, north, and which may be expressed as $\beta_1 + \pi <= \delta_{RV} < 3\pi/2$.

FIG. 6 is a diagram of identifying inter-vehicle state information including convergence information for the first orientation sector. Identifying inter-vehicle state information may be implemented in a vehicle, such as the vehicle 1000 shown in FIG. 1 or the vehicles 2100/2110 shown in FIG. 2.

In some embodiments, for the first orientation sector $Q_1$, any or all of a host vehicle expected path 6000 for the host vehicle (HV), respective remote vehicle expected paths 6100 for one or more of the remote vehicles (RV), or respective expected paths 6000/6100 for the host vehicle and for one or more of the remote vehicles are identified. In some embodiments, the expected paths may be projected, such as in a straight line, from the respective heading information.

Some embodiments include determining whether the remote vehicle expected path and the host vehicle expected path are convergent. A determination that the remote vehicle expected path and the remote vehicle expected path are convergent may indicate that the host vehicle expected path and the respective remote vehicle expected path intersect.

In some embodiments, for the first orientation sector $Q_1$, determining whether the remote vehicle expected path and the host vehicle expected path are convergent may include examining defined convergence data, such as Table 1 below. In Table 1 a value of zero (0) indicates that the remote vehicle expected path and the host vehicle expected path are not convergent and do not cross, a value of one (1) indicates that the remote vehicle expected path and the host vehicle expected path are convergent and do cross. A value of $\eta_{HV}$ indicates that the remote vehicle expected path and the host vehicle expected path are convergent and do cross if the host vehicle heading angle $\delta_{HV}$ is greater than the remote vehicle heading angle $\delta_{RV}$ and are not convergent and do not cross if the remote vehicle heading angle $\delta_{RV}$ is at least the host vehicle heading angle $\delta_{HV}$. A value of $\eta_{RV}$ indicates that the remote vehicle expected path and the host vehicle expected path are convergent and do cross if the host vehicle heading angle $\delta_{HV}$ is less than the remote vehicle heading angle $\delta_{RV}$ and are not convergent and do not cross if the host vehicle heading angle $\delta_{HV}$ is at least the remote vehicle heading angle $\delta_{RV}$. The notation $HV_n$ indicates that the host vehicle region is region n. For example, $HV_1$ indicates that the host vehicle region is the first region and $HV_6$ indicates that the host vehicle region is the sixth region. The notation $RV_n$ indicates that the remote vehicle region is region n. For example, $RV_1$ indicates that the remote vehicle region is the first region and $RV_6$ indicates that the remote vehicle region is the sixth region.

TABLE 1

|        | $RV_1$ | $RV_2$ | $RV_3$ | $RV_4$ | $RV_5$ | $RV_6$ |
|--------|--------|--------|--------|--------|--------|--------|
| $HV_1$ | $\eta_{HV}$ | 0 | 0 | 0 | 1 | 1 |
| $HV_2$ | 0 | $\eta_{RV}$ | 1 | 1 | 0 | 0 |
| $HV_3$ | 0 | 0 | $\eta_{RV}$ | 1 | 0 | 0 |
| $HV_4$ | 0 | 0 | 0 | $\eta_{RV}$ | 0 | 0 |
| $HV_5$ | 0 | 0 | 0 | 0 | $\eta_{HV}$ | 0 |
| $HV_6$ | 0 | 0 | 0 | 0 | 1 | $\eta_{HV}$ |

In some embodiments, for the first orientation sector $Q_1$, determining $\eta_{HV}$ may be expressed as the following:

$$\eta_{HV} = \frac{1}{2}\left[\frac{\delta_{HV} - \delta_{RV} - \sigma}{|\delta_{RV} - \delta_{HV}| + \sigma} + 1\right]. \quad \text{[Equation 3]}$$

In some embodiments, for the first orientation sector $Q_1$, determining $\eta_{RV}$ may be expressed as the following:

$$\eta_{RV} = \frac{1}{2}\left[\frac{\delta_{RV} - \delta_{HV} - \sigma}{|\delta_{RV} - \delta_{HV}| + \sigma} + 1\right]. \quad \text{[Equation 4]}$$

In some embodiments, for the first orientation sector $Q_1$, a combination ($F_{m,n}$) of the host vehicle heading angle $\delta_{HV}$ and the remote vehicle heading angle $\delta_{RV}$ may be expressed as shown in Tables 2-4.

TABLE 2

| $F_{m,n}$ | $RV_1$ | $RV_2$ | $RV_3$ | $RV_4$ | $RV_5$ | $RV_6$ |
|-----------|--------|--------|--------|--------|--------|--------|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 3

| | |
|---|---|
| $H_1$ | $\frac{1}{4}\left[\frac{\delta_{HV} - 0 - \sigma}{|\delta_{HV} - 0| + \sigma} + 1\right] \times \left[\frac{\beta_1 - \delta_{HV} - \sigma}{|\beta_1 - \delta_{HV}| + \sigma} + 1\right]$ |
| $H_2$ | $\frac{1}{4}\left[\frac{\delta_{HV} - \beta_1 - \sigma}{|\delta_{HV} - \beta_1| + \sigma} + 1\right] \times \left[\frac{\frac{\pi}{2} - \delta_{HV} - \sigma}{\left|\frac{\pi}{2} - \delta_{HV}\right| + \sigma} + 1\right]$ |
| $H_3$ | $\frac{1}{4}\left[\frac{\delta_{HV} - \frac{\pi}{2} - \sigma}{\left|\delta_{HV} - \frac{\pi}{2}\right| + \sigma} + 1\right] \times \left[\frac{\pi - \delta_{HV} - \sigma}{|\pi - \delta_{HV}| + \sigma} + 1\right]$ |
| $H_4$ | $\frac{1}{4}\left[\frac{\delta_{HV} - \pi - \sigma}{|\delta_{HV} - \pi| + \sigma} + 1\right] \times \left[\frac{\beta_1 + \pi - \delta_{HV} - \sigma}{|\beta_1 + \pi - \delta_{HV}| + \sigma} + 1\right]$ |
| $H_5$ | $\frac{1}{4}\left[\frac{\delta_{HV} - (\beta_1 + \pi) - \sigma}{|\delta_{HV} - (\beta_1 + \pi)| + \sigma} + 1\right] \times \left[\frac{\frac{3\pi}{2} - \delta_{HV} - \sigma}{\left|\frac{3\pi}{2} - \delta_{HV}\right| + \sigma} + 1\right]$ |
| $H_6$ | $\frac{1}{4}\left[\frac{\delta_{HV} - \frac{3\pi}{2} - \sigma}{\left|\delta_{HV} - \frac{3\pi}{2}\right| + \sigma} + 1\right] \times \left[\frac{2\pi - \delta_{HV} - \sigma}{|2\pi - \delta_{HV}| + \sigma} + 1\right]$ |

TABLE 4

| | |
|---|---|
| $R_1$ | $\frac{1}{4}\left[\frac{\delta_{RV}-0-\sigma}{|\delta_{RV}-0|+\sigma}+1\right]\times\left[\frac{\beta_1-\delta_{RV}-\sigma}{|\beta_1-\delta_{RV}|+\sigma}+1\right]$ |
| $R_2$ | $\frac{1}{4}\left[\frac{\delta_{RV}-\beta_1-\sigma}{|\delta_{RV}-\beta_1|+\sigma}+1\right]\times\left[\frac{\frac{\pi}{2}-\delta_{RV}-\sigma}{\left|\frac{\pi}{2}-\delta_{RV}\right|+\sigma}+1\right]$ |
| $R_3$ | $\frac{1}{4}\left[\frac{\delta_{RV}-\frac{\pi}{2}-\sigma}{\left|\delta_{RV}-\frac{\pi}{2}\right|+\sigma}+1\right]\times\left[\frac{\pi-\delta_{RV}-\sigma}{|\pi-\delta_{RV}|+\sigma}+1\right]$ |
| $R_4$ | $\frac{1}{4}\left[\frac{\delta_{RV}-\pi-\sigma}{|\delta_{RV}-\pi|+\sigma}+1\right]\times\left[\frac{\beta_1+\pi-\delta_{RV}-\sigma}{|\beta_1+\pi-\delta_{RV}|+\sigma}+1\right]$ |

TABLE 4-continued

| | |
|---|---|
| $R_5$ | $\frac{1}{4}\left[\frac{\delta_{RV}-(\beta_1+\pi)-\sigma}{|\delta_{RV}-(\beta_1+\pi)|+\sigma}+1\right]\times\left[\frac{\frac{3\pi}{2}-\delta_{RV}-\sigma}{\left|\frac{3\pi}{2}-\delta_{RV}\right|+\sigma}+1\right]$ |
| $R_6$ | $\frac{1}{4}\left[\frac{\delta_{RV}-\frac{3\pi}{2}-\sigma}{\left|\delta_{RV}-\frac{3\pi}{2}\right|+\sigma}+1\right]\times\left[\frac{2\pi-\delta_{RV}-\sigma}{|2\pi-\delta_{RV}|+\sigma}+1\right]$ |

In some embodiments, for the first orientation sector $Q_1$, a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$ are determined, as expressed in Table 5.

TABLE 5

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_2$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_3$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_4$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_5$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ |
| $HV_6$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ |

Some embodiments include determining, for the first orientation sector $Q_1$, a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 6.

TABLE 6

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $\delta_{RV}-\beta_1+\pi$ | 0 | 0 | 0 | $\delta_{RV}-\beta_1-\pi$ | $\delta_{RV}-\beta_1-\pi$ |
| $HV_2$ | 0 | $-(\delta_{RV}-\beta_1-\pi)$ | $-(\delta_{RV}-\beta_1-\pi)$ | $-(\delta_{RV}-\beta_1-\pi)$ | 0 | 0 |
| $HV_3$ | 0 | 0 | $-(\delta_{RV}-\beta_1-\pi)$ | $-(\delta_{RV}-\beta_1-\pi)$ | 0 | 0 |
| $HV_4$ | 0 | 0 | 0 | $-(\delta_{RV}-\beta_1-\pi)$ | 0 | 0 |
| $HV_5$ | 0 | 0 | 0 | 0 | $\delta_{RV}-\beta_1-\pi$ | 0 |
| $HV_6$ | 0 | 0 | 0 | 0 | $\delta_{RV}-\beta_1-\pi$ | $\delta_{RV}-\beta_1-\pi$ |

Some embodiments include determining, for the first orientation sector $Q_1$, an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 7.

TABLE 7

| $\alpha_D=$ | $RV_1$ | $RV_2$ | $RV_3$ | $RV_4$ | $RV_5$ | $RV_6$ |
|---|---|---|---|---|---|---|
| $HV_1$ | $\delta_{HV}-\delta_{RV}$ | 0 | 0 | 0 | $2\pi-\delta_{HV}-\delta_{RV}$ | $2\pi-\delta_{HV}-\delta_{RV}$ |
| $HV_2$ | 0 | $-(\delta_{HV}-\delta_{RV})$ | $-(\delta_{HV}-\delta_{RV})$ | $-(\delta_{HV}-\delta_{RV})$ | 0 | 0 |
| $HV_3$ | 0 | 0 | $-(\delta_{HV}-\delta_{RV})$ | $-(\delta_{HV}-\delta_{RV})$ | 0 | 0 |
| $HV_4$ | 0 | 0 | 0 | $-(\delta_{HV}-\delta_{RV})$ | 0 | 0 |
| $HV_5$ | 0 | 0 | 0 | 0 | $\delta_{RV}-\beta_1-\pi$ | 0 |
| $HV_6$ | 0 | 0 | 0 | 0 | $\delta_{HV}-\delta_{RV}$ | $\delta_{HV}-\delta_{RV}$ |

In FIG. 6, $L_{HV}$ indicates a distance from the host vehicle to the projected point of convergence with the remote vehicle expected path, and $L_{RV}$ indicates a distance from the remote vehicle to the projected point of convergence with the host vehicle expected path.

FIG. 7 is a diagram of identifying inter-vehicle state information including a geodesic for a second orientation sector. Identifying inter-vehicle state information including the geodesic for the second orientation sector may be similar to the identification shown in FIG. 5, except as described herein. In the second orientation sector $Q_2$ the remote vehicle, and the geodesic, is located to the southeast of the host vehicle in the geospatial domain.

As shown in FIG. 7, for the second orientation sector $Q_2$, some embodiments include determining a host vehicle region for the host vehicle. A first host vehicle region may include host vehicle heading angles $\delta_{HV}$ from the reference direction, which may correspond with north, to ninety degrees, which may correspond with east, and which may be expressed as $0<=\delta_{HV}<\pi/2$. A second host vehicle region may include host vehicle heading angles $\delta_{HV}$ from ninety degrees to the convergence angle $\beta_1$ of the geodesic, and which may be expressed as $\pi/2<=\delta_{HV}<\beta_1$. A third host vehicle region may include host vehicle heading angles $\delta_{HV}$ from the convergence angle $\beta_1$ of the geodesic to 180 degrees, which may correspond with south, and which may be expressed as $\beta_1<=\delta_{HV}<\pi$. A fourth host vehicle region may include host vehicle heading angles $\delta_{HV}$ from 180 degrees to 270 degrees, which may correspond with west, and which may be expressed as $\pi<=\delta_{HV}<3\pi/2$. A fifth host vehicle region may include host vehicle heading angles $\delta_{HV}$ from 270 degrees to a sum of the convergence angle $\beta_1$ of the geodesic and 180 degrees $\pi$, which may be expressed as $3\pi/2<=\delta_{HV}<\beta_1+\pi$. A sixth host vehicle region may include host vehicle heading angles $\delta_{HV}$ from the sum of the convergence angle $\beta_1$ of the geodesic and 180 degrees $\pi$ to 360 degrees, which may correspond with the reference direction, north, and which may be expressed as $\beta_1+\pi<=\delta_{HV}<2\pi$.

As shown in FIG. 7, for the second orientation sector, some embodiments include determining a remote vehicle region for the remote vehicle. A first remote vehicle region may include remote vehicle heading angles $\delta_{RV}$ from the reference direction, which may correspond with north, to ninety degrees, which may correspond with east, and which may be expressed as $0<=\delta_{RV}<\pi/2$. A second remote vehicle region may include remote vehicle heading angles $\delta_{RV}$ from ninety degrees to the convergence angle $\beta_1$ of the geodesic, and which may be expressed as $\pi/2<=\delta_{RV}<\beta_1$. A third remote vehicle region may include remote vehicle heading angles $\delta_{RV}$ from the convergence angle $\beta_1$ of the geodesic to 180 degrees, which may correspond with south, and which may be expressed as $\beta_1<=\delta_{RV}<\pi$. A fourth remote vehicle region may include remote vehicle heading angles $\delta_{RV}$ from 180 degrees to 270 degrees, which may correspond with west, and which may be expressed as $\pi<=\delta_{RV}<3\pi/2$. A fifth remote vehicle region may include remote vehicle heading angles $\delta_{RV}$ from 270 degrees to a sum of the convergence angle $\beta_1$ of the geodesic and 180 degrees $\pi$, which may be expressed as $3\pi/2<=\delta_{RV}<\beta_1+\pi$. A sixth remote vehicle region may include remote vehicle heading angles $\delta_{RV}$ from the sum of the convergence angle $\beta_1$ of the geodesic and 180 degrees $\pi$ to 360 degrees, which may correspond with the reference direction, north, and which may be expressed as $\beta_1+\pi<=\delta_{RV}<2\pi$.

FIG. 8 is a diagram of identifying inter-vehicle state information including convergence information for the second orientation sector. Identifying inter-vehicle state information including a geodesic for the second orientation sector may be similar to the identification shown in FIG. 6, except as described herein.

Some embodiments include identifying, for the second orientation sector $Q_2$, a host vehicle expected path 8000 for the host vehicle (HV), respective remote vehicle expected paths 8100 for one or more of the remote vehicles (RV), or identifying respective expected paths 8000/8100 for the host vehicle and for one or more of the remote vehicles. In some embodiments, the expected paths may be projected, such as in a straight line, from the respective heading information.

Some embodiments include determining whether the remote vehicle expected path and the host vehicle expected path are convergent. A determination that the remote vehicle expected path and the host vehicle expected path are convergent may indicate that the host vehicle expected path and the respective remote vehicle expected path intersect.

In some embodiments, for the second orientation sector $Q_2$, determining whether the remote vehicle expected path and the host vehicle expected path are convergent may include examining defined convergence data, such as the defined convergence data shown in Table 8.

TABLE 8

|     | $RV_1$ | $RV_2$ | $RV_3$ | $RV_4$ | $RV_5$ | $RV_6$ |
|-----|--------|--------|--------|--------|--------|--------|
| $HV_1$ | $\eta_{HV}$ | 0 | 0 | 0 | 0 | 1 |
| $HV_2$ | 1 | $\eta_{HV}$ | 0 | 0 | 0 | 1 |
| $HV_3$ | 0 | 1 | $\eta_{RV}$ | 1 | 1 | 0 |
| $HV_4$ | 0 | 1 | 1 | $\eta_{RV}$ | 1 | 0 |
| $HV_5$ | 0 | 0 | 0 | 0 | $\eta_{RV}$ | 0 |
| $HV_6$ | 0 | 0 | 0 | 0 | 0 | $\eta_{HV}$ |

In some embodiments, for the second orientation sector, determining $\eta_{HV}$ may be expressed as shown in Equation 3. In some embodiments, determining $\eta_{RV}$ may be expressed as shown in Equation 4.

In some embodiments, for the second orientation sector $Q_2$, a combination ($F_{m,n}$) of the host vehicle heading angle $\delta_{HV}$ and the remote vehicle heading angle $\delta_{RV}$ may be expressed as shown in Tables 9-11.

TABLE 9

| $F_{m,n}$ | $RV_1$ | $RV_2$ | $RV_3$ | $RV_4$ | $RV_5$ | $RV_6$ |
|-----------|--------|--------|--------|--------|--------|--------|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 10

| $H_1$ | $\frac{1}{4}\left[\frac{\delta_{HV}-0-\sigma}{|\delta_{HV}-0|+\sigma}+1\right] \times \left[\frac{\frac{\pi}{2}-\delta_{HV}-\sigma}{\left|\frac{\pi}{2}-\delta_{HV}\right|+\sigma}+1\right]$ |
|---|---|
| $H_2$ | $\frac{1}{4}\left[\frac{\delta_{HV}-\frac{\pi}{2}-\sigma}{\left|\delta_{HV}-\frac{\pi}{2}\right|+\sigma}+1\right] \times \left[\frac{\beta_1-\delta_{HV}-\sigma}{|\beta_1-\delta_{HV}|+\sigma}+1\right]$ |
| $H_3$ | $\frac{1}{4}\left[\frac{\delta_{HV}-\beta_1-\sigma}{|\delta_{HV}-\beta_1|+\sigma}+1\right] \times \left[\frac{\pi-\delta_{HV}-\sigma}{|\pi-\delta_{HV}|+\sigma}+1\right]$ |

TABLE 10-continued $H_4$ $\quad \frac{1}{4}\left[\frac{\delta_{HV} - \pi - \sigma}{|\delta_{HV} - \pi| + \sigma} + 1\right] \times \left[\frac{\frac{3\pi}{2} - \delta_{HV} - \sigma}{\left|\frac{3\pi}{2} - \delta_{HV}\right| + \sigma} + 1\right]$ $H_5$ $\quad \frac{1}{4}\left[\frac{\delta_{HV} - \frac{3\pi}{2} - \sigma}{\left|\delta_{HV} - \frac{3\pi}{2}\right| + \sigma} + 1\right] \times \left[\frac{\beta_1 + \pi - \delta_{HV} - \sigma}{|\beta_1 + \pi - \delta_{HV}| + \sigma} + 1\right]$ $H_6$ $\quad \frac{1}{4}\left[\frac{\delta_{HV} - (\beta_1 + \pi) - \sigma}{|\delta_{HV} - (\beta_1 + \pi)| + \sigma} + 1\right] \times \left[\frac{2\pi - \delta_{HV} - \sigma}{|2\pi - \delta_{HV}| + \sigma} + 1\right]$

TABLE 11

$R_1$ $\quad \frac{1}{4}\left[\frac{\delta_{RV} - 0 - \sigma}{|\delta_{RV} - 0| + \sigma} + 1\right] \times \left[\frac{\frac{\pi}{2} - \delta_{RV} - \sigma}{\left|\frac{\pi}{2} - \delta_{RV}\right| + \sigma} + 1\right]$ $R_2$ $\quad \frac{1}{4}\left[\frac{\delta_{RV} - \frac{\pi}{2} - \sigma}{\left|\delta_{RV} - \frac{\pi}{2}\right| + \sigma} + 1\right] \times \left[\frac{\beta_1 - \delta_{RV} - \sigma}{|\beta_1 - \delta_{RV}| + \sigma} + 1\right]$ TABLE 11-continued $R_3$ $\quad \frac{1}{4}\left[\frac{\delta_{RV} - \beta_1 - \sigma}{|\delta_{RV} - \beta_1| + \sigma} + 1\right] \times \left[\frac{\pi - \delta_{RV} - \sigma}{|\pi - \delta_{RV}| + \sigma} + 1\right]$ $R_4$ $\quad \frac{1}{4}\left[\frac{\delta_{RV} - \pi - \sigma}{|\delta_{RV} - \pi| + \sigma} + 1\right] \times \left[\frac{\frac{3\pi}{2} - \delta_{RV} - \sigma}{\left|\frac{3\pi}{2} - \delta_{RV}\right| + \sigma} + 1\right]$ $R_5$ $\quad \frac{1}{4}\left[\frac{\delta_{RV} - \frac{3\pi}{2} - \sigma}{\left|\delta_{RV} - \frac{3\pi}{2}\right| + \sigma} + 1\right] \times \left[\frac{(\beta_1 + \pi) - \delta_{RV} - \sigma}{|(\beta_1 + \pi) - \delta_{RV}| + \sigma} + 1\right]$ $R_6$ $\quad \frac{1}{4}\left[\frac{\delta_{RV} - (\beta_1 + \pi) - \sigma}{|\delta_{RV} - (\beta_1 + \pi)| + \sigma} + 1\right] \times \left[\frac{2\pi - \delta_{RV} - \sigma}{|2\pi - \delta_{RV}| + \sigma} + 1\right]$ Some embodiments include determining, for the second orientation sector $Q_2$, a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 12.

TABLE 12

| $\alpha_{HV} =$ | $RV_1$ | $RV_2$ | $RV_3$ | $RV_4$ | $RV_5$ | $RV_6$ |
|---|---|---|---|---|---|---|
| $HV_1$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_2$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_3$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_4$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_5$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_6$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ | $2\pi - (\delta_{HV} - \beta_1)$ |

Some embodiments include determining, for the second orientation sector $Q_2$, a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 13.

TABLE 13

| $\alpha_{RV} =$ | $RV_1$ | $RV_2$ | $RV_3$ | $RV_4$ | $RV_5$ | $RV_6$ |
|---|---|---|---|---|---|---|
| $HV_1$ | $\delta_{RV} - \beta_1 + \pi$ | 0 | 0 | 0 | 0 | $\delta_{RV} - \beta_1 - \pi$ |
| $HV_2$ | $\delta_{RV} - \beta_1 + \pi$ | $\delta_{RV} - \beta_1 + \pi$ | 0 | 0 | 0 | $\delta_{RV} - \beta_1 - \pi$ |
| $HV_3$ | 0 | 0 | $-(\delta_{RV} - \beta_1 - \pi)$ | $-(\delta_{RV} - \beta_1 - \pi)$ | $-(\delta_{RV} - \beta_1 - \pi)$ | 0 |
| $HV_4$ | 0 | 0 | 0 | $-(\delta_{RV} - \beta_1 - \pi)$ | $-(\delta_{RV} - \beta_1 - \pi)$ | 0 |
| $HV_5$ | 0 | 0 | 0 | 0 | $-(\delta_{RV} - \beta_1 - \pi)$ | 0 |
| $HV_6$ | 0 | 0 | 0 | 0 | 0 | $\delta_{RV} - \beta_1 - \pi$ |

Some embodiments include determining, for the second orientation sector, an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 14.

TABLE 14

| $\alpha_D =$ | $RV_1$ | $RV_2$ | $RV_3$ | $RV_4$ | $RV_5$ | $RV_6$ |
|---|---|---|---|---|---|---|
| $HV_1$ | $\delta_{HV} - \delta_{RV}$ | 0 | 0 | 0 | 0 | $\delta_{HV} - \delta_{RV} + 2\pi$ |
| $HV_2$ | $\delta_{HV} - \delta_{RV}$ | $\delta_{HV} - \delta_{RV}$ | 0 | 0 | 0 | $\delta_{HV} - \delta_{RV} + 2\pi$ |
| $HV_3$ | 0 | 0 | $-(\delta_{HV} - \delta_{RV})$ | $-(\delta_{HV} - \delta_{RV})$ | $-(\delta_{HV} - \delta_{RV})$ | 0 |

TABLE 14-continued

| $\alpha_D =$ | $RV_1$ | $RV_2$ | $RV_3$ | $RV_4$ | $RV_5$ | $RV_6$ |
|---|---|---|---|---|---|---|
| $HV_4$ | 0 | 0 | 0 | $-(\delta_{HV} - \delta_{RV})$ | $-(\delta_{HV} - \delta_{RV})$ | 0 |
| $HV_5$ | 0 | 0 | 0 | 0 | $-(\delta_{HV} - \delta_{RV})$ | 0 |
| $HV_6$ | 0 | 0 | 0 | 0 | 0 | $\delta_{HV} - \delta_{RV}$ |

In FIG. 8, $L_{HV}$ indicates a distance from the host vehicle to the projected point of convergence with the remote vehicle expected path, and $L_{RV}$ indicates a distance from the remote vehicle to the projected point of convergence with the host vehicle expected path.

FIG. 9 is a diagram of identifying inter-vehicle state information including a geodesic for a third orientation sector. Identifying inter-vehicle state information including a geodesic for a third orientation sector may be similar to the identification shown in FIG. 5, except as described herein. In the third orientation sector $Q_3$ the remote vehicle, and the geodesic, is located to the southwest of the host vehicle in the geospatial domain.

As shown in FIG. 9, for the third orientation sector, some embodiments include determining a host vehicle region for the host vehicle. A first host vehicle region may include host vehicle heading angles $\delta_{HV}$ from the reference direction, which may correspond with north, to a difference of the convergence angle $\beta_1$ of the geodesic and 180 degrees $\pi$, which may be expressed as $0<=\delta_{HV}<\beta_1-\pi$. A second host vehicle region may include host vehicle heading angles $\delta_{HV}$ from the difference of the convergence angle $\beta_1$ of the geodesic and 180 degrees to ninety degrees, which may correspond with east, and which may be expressed as $\beta_1-\pi<=\delta_{HV}<\pi/2$. A third host vehicle region may include host vehicle heading angles $\delta_{HV}$ from ninety degrees to 180 degrees, which may correspond with south, and which may be expressed as $\pi/2<=\delta_{HV}<\pi$. A fourth host vehicle region may include host vehicle heading angles $\delta_{HV}$ from 180 degrees to the convergence angle $\beta_1$ of the geodesic, which may be expressed as $\pi<=\delta_{HV}<\beta_1$. A fifth host vehicle region may include host vehicle heading angles $\delta_{HV}$ from the convergence angle $\beta_1$ of the geodesic, to 270 degrees, which may correspond with west, and which may be expressed as $\beta_1<=\delta_{HV}<3\pi/2$. A sixth host vehicle region may include host vehicle heading angles $\delta_{HV}$ from 270 degrees to 360 degrees, which may correspond with the reference direction, north, and which may be expressed as $3\pi/2<=\delta_{HV}<2\pi$.

As shown in FIG. 9, for the third orientation sector, some embodiments include determining a remote vehicle region for the remote vehicle. A first remote vehicle region may include remote vehicle heading angles $\delta_{RV}$ from the reference direction, which may correspond with north, to a difference of the convergence angle $\beta_1$ of the geodesic and 180 degrees $\pi$, which may be expressed as $0<=\delta_{RV}<\beta_1-\pi$. A second remote vehicle region may include remote vehicle heading angles $\delta_{RV}$ from the difference of the convergence angle $\beta_1$ of the geodesic and 180 degrees $\pi$ to ninety degrees, which may correspond with east, and which may be expressed as $\beta_1-\pi<=\delta_{RV}<\pi/2$. A third remote vehicle region may include remote vehicle heading angles $\delta_{RV}$ from ninety degrees to 180 degrees, which may correspond with south, and which may be expressed as $\pi/2<=\delta_{RV}<\pi$. A fourth remote vehicle region may include remote vehicle heading angles $\delta_{RV}$ from 180 degrees to the convergence angle $\beta_1$ of the geodesic, which may be expressed as $\pi<=\delta_{RV}<\beta_1$. A fifth remote vehicle region may include remote vehicle heading angles $\delta_{RV}$ from the convergence angle $\beta_1$ of the geodesic, to 270 degrees, which may correspond with west, and which may be expressed as $\beta_1<=\delta_{RV}<3\pi/2$. A sixth remote vehicle region may include remote vehicle heading angles $\delta_{RV}$ from 270 degrees to 360 degrees, which may correspond with the reference direction, north, and which may be expressed as $3\pi/2<=\delta_{RV}<2\pi$.

FIG. 10 is a diagram of identifying inter-vehicle state information including convergence information for the third orientation sector. Identifying inter-vehicle state information including a geodesic for the third orientation sector may be similar to the identification shown in FIG. 6, except as described herein.

Some embodiments include identifying, for the third orientation sector $Q_3$, a host vehicle expected path 10000 for the host vehicle (HV), respective remote vehicle expected paths 10100 for one or more of the remote vehicles (RV), or respective expected paths 10000/10100 for the host vehicle and for one or more of the remote vehicles. In some embodiments, the expected paths may be projected, such as in a straight line, from the respective heading information.

Some embodiments include determining whether the remote vehicle expected path and the host vehicle expected path are convergent, which may indicate that the host vehicle expected path and the respective remote vehicle expected path intersect.

In some embodiments for the third orientation sector $Q_3$, determining whether the remote vehicle expected path and the host vehicle expected path are convergent may include examining defined convergence data, such as the defined convergence data shown in Table 15.

TABLE 15

|  | $RV_1$ | $RV_2$ | $RV_3$ | $RV_4$ | $RV_5$ | $RV_6$ |
|---|---|---|---|---|---|---|
| $HV_1$ | $\eta_{RV}$ | 0 | 0 | 0 | 0 | 0 |
| $HV_2$ | 0 | $\eta_{HV}$ | 0 | 0 | 0 | 0 |
| $HV_3$ | 0 | 1 | $\eta_{HV}$ | 0 | 0 | 0 |
| $HV_4$ | 0 | 1 | 1 | $\eta_{HV}$ | 0 | 0 |
| $HV_5$ | 1 | 0 | 0 | 0 | $\eta_{RV}$ | 1 |
| $HV_6$ | 1 | 0 | 0 | 0 | 0 | $\eta_{RV}$ |

In some embodiments, for the third orientation sector $Q_3$, determining $\eta_{HV}$ may be expressed as shown in Equation 3. In some embodiments, determining $\eta_{RV}$ may be expressed as shown in Equation 4.

In some embodiments, for the third orientation sector $Q_3$, a combination ($F_{m,n}$) of the host vehicle heading angle $\delta_{HV}$ and the remote vehicle heading angle $\delta_{RV}$ may be expressed as shown in Tables 16-18.

TABLE 16

| $F_{m,n}$ | $RV_1$ | $RV_2$ | $RV_3$ | $RV_4$ | $RV_5$ | $RV_6$ |
|---|---|---|---|---|---|---|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |

TABLE 16-continued

| $F_{m,n}$ | $RV_1$ | $RV_2$ | $RV_3$ | $RV_4$ | $RV_5$ | $RV_6$ |
|---|---|---|---|---|---|---|
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 17

| $H_1$ | $\frac{1}{4}\left[\frac{\delta_{HV}-0-\sigma}{|\delta_{HV}-0|+\sigma}+1\right] \times \left[\frac{\beta_1-\pi-\delta_{HV}-\sigma}{|\beta_1-\pi-\delta_{HV}|+\sigma}+1\right]$ |
| $H_2$ | $\frac{1}{4}\left[\frac{\delta_{HV}-(\beta_1-\pi)-\sigma}{|\delta_{HV}-(\beta_1-\pi)|+\sigma}+1\right] \times \left[\frac{\frac{\pi}{2}-\delta_{HV}-\sigma}{\left|\frac{\pi}{2}-\delta_{HV}\right|+\sigma}+1\right]$ |
| $H_3$ | $\frac{1}{4}\left[\frac{\delta_{HV}-\frac{\pi}{2}-\sigma}{\left|\delta_{HV}-\frac{\pi}{2}\right|+\sigma}+1\right] \times \left[\frac{\pi-\delta_{HV}-\sigma}{|\pi-\delta_{HV}|+\sigma}+1\right]$ |
| $H_4$ | $\frac{1}{4}\left[\frac{\delta_{HV}-\pi-\sigma}{|\delta_{HV}-\pi|+\sigma}+1\right] \times \left[\frac{\beta_1-\delta_{HV}-\sigma}{|\beta_1-\delta_{HV}|+\sigma}+1\right]$ |
| $H_5$ | $\frac{1}{4}\left[\frac{\delta_{HV}-\beta_1-\sigma}{|\delta_{HV}-\beta_1|+\sigma}+1\right] \times \left[\frac{\frac{3\pi}{2}-\delta_{HV}-\sigma}{\left|\frac{3\pi}{2}-\delta_{HV}\right|+\sigma}+1\right]$ |
| $H_6$ | $\frac{1}{4}\left[\frac{\delta_{HV}-\frac{3\pi}{2}-\sigma}{\left|\delta_{HV}-\frac{3\pi}{2}\right|+\sigma}+1\right] \times \left[\frac{2\pi-\delta_{HV}-\sigma}{|2\pi-\delta_{HV}|+\sigma}+1\right]$ |

TABLE 18

| $R_1$ | $\frac{1}{4}\left[\frac{\delta_{RV}-0-\sigma}{|\delta_{RV}-0|+\sigma}+1\right] \times \left[\frac{\beta_1-\pi-\delta_{RV}-\sigma}{|\beta_1-\pi-\delta_{RV}|+\sigma}+1\right]$ |
| $R_2$ | $\frac{1}{4}\left[\frac{\delta_{RV}-(\beta_1-\pi)-\sigma}{|\delta_{RV}-(\beta_1-\pi)|+\sigma}+1\right] \times \left[\frac{\frac{\pi}{2}-\delta_{RV}-\sigma}{\left|\frac{\pi}{2}-\delta_{RV}\right|+\sigma}+1\right]$ |
| $R_3$ | $\frac{1}{4}\left[\frac{\delta_{RV}-\frac{\pi}{2}-\sigma}{\left|\delta_{RV}-\frac{\pi}{2}\right|+\sigma}+1\right] \times \left[\frac{\pi-\delta_{RV}-\sigma}{|\pi-\delta_{RV}|+\sigma}+1\right]$ |
| $R_4$ | $\frac{1}{4}\left[\frac{\delta_{RV}-\pi-\sigma}{|\delta_{RV}-\pi|+\sigma}+1\right] \times \left[\frac{\beta_1-\delta_{RV}-\sigma}{|\beta_1-\delta_{RV}|+\sigma}+1\right]$ |
| $R_5$ | $\frac{1}{4}\left[\frac{\delta_{RV}-\beta_1-\sigma}{|\delta_{RV}-\beta_1|+\sigma}+1\right] \times \left[\frac{\frac{3\pi}{2}-\delta_{RV}-\sigma}{\left|\frac{3\pi}{2}-\delta_{RV}\right|+\sigma}+1\right]$ |
| $R_6$ | $\frac{1}{4}\left[\frac{\delta_{RV}-\frac{3\pi}{2}-\sigma}{\left|\delta_{RV}-\frac{3\pi}{2}\right|+\sigma}+1\right] \times \left[\frac{2\pi-\delta_{RV}-\sigma}{|2\pi-\delta_{RV}|+\sigma}+1\right]$ |

Some embodiments may include, for the third orientation sector $Q_3$, determining a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 19.

TABLE 19

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $\delta_{HV}-\beta_1+2\pi$ | $\delta_{HV}-\beta_1+2\pi$ | $\delta_{HV}-\beta_1+2\pi$ | $\delta_{HV}-\beta_1+2\pi$ | $\delta_{HV}-\beta_1+2\pi$ | $\delta_{HV}-\beta_1+2\pi$ |
| $HV_2$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_3$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_4$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_5$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_6$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |

Some embodiments may include, for the third orientation sector $Q_3$, determining a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 20.

TABLE 20

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $-(\delta_{RV}-\beta_1+\pi)$ | 0 | 0 | 0 | 0 | 0 |
| $HV_2$ | 0 | $\delta_{RV}-\beta_1+\pi$ | 0 | 0 | 0 | 0 |
| $HV_3$ | 0 | $\delta_{RV}-\beta_1+\pi$ | $\delta_{RV}-\beta_1+\pi$ | 0 | 0 | 0 |
| $HV_4$ | 0 | $\delta_{RV}-\beta_1+\pi$ | $\delta_{RV}-\beta_1+\pi$ | $\delta_{RV}-\beta_1+\pi$ | 0 | 0 |
| $HV_5$ | $-(\delta_{RV}-\beta_1+\pi)$ | 0 | 0 | 0 | $-(\delta_{RV}-\beta_1-\pi)$ | $-(\delta_{RV}-\beta_1-\pi)$ |
| $HV_6$ | $-(\delta_{RV}-\beta_1+\pi)$ | 0 | 0 | 0 | 0 | $-(\delta_{RV}-\beta_1-\pi)$ |

Some embodiments include determining, for the third orientation sector $Q_3$, an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 21.

TABLE 21

| $\alpha_D =$ | $RV_1$ | $RV_2$ | $RV_3$ | $RV_4$ | $RV_5$ | $RV_6$ |
|---|---|---|---|---|---|---|
| $HV_1$ | $-(\delta_{HV} - \delta_{RV})$ | 0 | 0 | 0 | 0 | 0 |
| $HV_2$ | 0 | $\delta_{HV} - \delta_{RV}$ | 0 | 0 | 0 | 0 |
| $HV_3$ | 0 | $\delta_{HV} - \delta_{RV}$ | $\delta_{HV} - \delta_{RV}$ | 0 | 0 | 0 |
| $HV_4$ | 0 | $\delta_{HV} - \delta_{RV}$ | $\delta_{HV} - \delta_{RV}$ | $\delta_{HV} - \delta_{RV}$ | 0 | 0 |
| $HV_5$ | $2\pi - (\delta_{HV} - \delta_{RV})$ | 0 | 0 | 0 | $-(\delta_{HV} - \delta_{RV})$ | $-(\delta_{HV} - \delta_{RV})$ |
| $HV_6$ | $2\pi - (\delta_{HV} - \delta_{RV})$ | 0 | 0 | 0 | 0 | $-(\delta_{HV} - \delta_{RV})$ |

In FIG. 10, $L_{HV}$ indicates a distance from the host vehicle to the projected point of convergence with the remote vehicle expected path, and $L_{RV}$ indicates a distance from the remote vehicle to the projected point of convergence with the host vehicle expected path.

FIG. 11 is a diagram of identifying inter-vehicle state information including a geodesic for a fourth orientation sector. Identifying inter-vehicle state information including a geodesic for a fourth orientation sector may be similar to the identification shown in FIG. 5, except as described herein. In the fourth orientation sector $Q_4$ the remote vehicle, and the geodesic, is located to the northwest of the host vehicle in the geospatial domain.

Some embodiments include determining, as shown in FIG. 11, for the fourth orientation sector $Q_4$, a host vehicle region for the host vehicle. A first host vehicle region may include host vehicle heading angles $\delta_{HV}$ from the reference direction, which may correspond with north, to ninety degrees, which may correspond with east, and which may be expressed as $0<=\delta_{HV}<\pi/2$. A second host vehicle region may include host vehicle heading angles $\delta_{HV}$ from ninety degrees to a difference of the convergence angle $\beta_1$ of the geodesic and 180 degrees $\pi$, which may be expressed as $\pi/2<=\delta_{HV}<\beta_1-\pi$. A third host vehicle region may include host vehicle heading angles $\delta_{HV}$ from the difference of the convergence angle $\beta_1$ of the geodesic and 180 degrees $\pi$ to 180 degrees, which may correspond with south, and which may be expressed as $\beta_1-\pi<=\delta_{HV}<\pi$. A fourth host vehicle region may include host vehicle heading angles $\delta_{HV}$ from 180 degrees to 270 degrees, which may correspond with west, and which may be expressed as $\pi<=\delta_{HV}<3\pi/2$. A fifth host vehicle region may include host vehicle heading angles $\delta_{HV}$ from 270 degrees to the convergence angle $\beta_1$ of the geodesic, which may be expressed as $3\pi/2<=\delta_{HV}<\beta_1$. A sixth host vehicle region may include host vehicle heading angles $\delta_{HV}$ from the convergence angle $\beta_1$ of the geodesic to 360 degrees, which may correspond with the reference direction, north, and which may be expressed as $\beta_1<=\delta_{HV}<2\pi$.

Some embodiments include determining, as shown in FIG. 11, for the fourth orientation sector, a remote vehicle region for the remote vehicle. A first remote vehicle region may include remote vehicle heading angles $\delta_{RV}$ from the reference direction, which may correspond with north, to ninety degrees, which may correspond with east, and which may be expressed as $0<=\delta_{RV}<\pi/2$. A second remote vehicle region may include remote vehicle heading angles $\delta_{RV}$ from ninety degrees to a difference of the convergence angle $\beta_1$ of the geodesic and 180 degrees $\pi$, which may be expressed as $\pi/2<=\delta_{RV}<\beta_1-\pi$. A third remote vehicle region may include remote vehicle heading angles $\delta_{RV}$ from the difference of the convergence angle $\beta_1$ of the geodesic and 180 degrees $\pi$ to 180 degrees, which may correspond with south, and which may be expressed as $\beta_1-\pi<=\delta_{RV}<\pi$. A fourth remote vehicle region may include remote vehicle heading angles $\delta_{RV}$ from 180 degrees to 270 degrees, which may correspond with west, and which may be expressed as $\pi<=\delta_{RV}<3\pi/2$. A fifth remote vehicle region may include remote vehicle heading angles $\delta_{RV}$ from 270 degrees to the convergence angle $\beta_1$ of the geodesic, which may be expressed as $3\pi/2<=\delta_{RV}<\beta_1$. A sixth remote vehicle region may include remote vehicle heading angles $\delta_{RV}$ from the convergence angle $\beta_1$ of the geodesic to 360 degrees, which may correspond with the reference direction, north, and which may be expressed as $\beta_1<=\delta_{RV}<2\pi$.

FIG. 12 is a diagram of identifying inter-vehicle state information including convergence information for the fourth orientation sector. Identifying inter-vehicle state information including a geodesic for a fourth orientation sector may be similar to the identification shown in FIG. 6, except as described herein.

Some embodiments include identifying, for the fourth orientation sector $Q_4$, a host vehicle expected path 12000 for the host vehicle (HV), respective remote vehicle expected paths 12100 for one or more of the remote vehicles (RV), or respective expected paths 12000/12100 for the host vehicle and for one or more of the remote vehicles. In some embodiments, the expected paths may be projected, such as in a straight line, from the respective heading information.

Some embodiments include determining whether the remote vehicle expected path and the host vehicle expected path are convergent, which may indicate that the host vehicle expected path and the respective remote vehicle expected path intersect.

In some embodiments, for the fourth orientation sector $Q_4$, determining whether the remote vehicle expected path and the host vehicle expected path are convergent may include examining defined convergence data, such as the defined convergence data shown in Table 22.

TABLE 22

|  | $RV_1$ | $RV_2$ | $RV_3$ | $RV_4$ | $RV_5$ | $RV_6$ |
|---|---|---|---|---|---|---|
| $HV_1$ | $\eta_{RV}$ | 1 | 0 | 0 | 0 | 0 |
| $HV_2$ | 0 | $\eta_{RV}$ | 0 | 0 | 0 | 0 |
| $HV_3$ | 0 | 0 | $\eta_{HV}$ | 0 | 0 | 0 |
| $HV_4$ | 0 | 0 | 1 | $\eta_{HV}$ | 0 | 0 |
| $HV_5$ | 0 | 0 | 1 | 1 | $\eta_{HV}$ | 0 |
| $HV_6$ | 1 | 1 | 0 | 0 | 1 | $\eta_{RV}$ |

In some embodiments, determining $\eta_{HV}$ may be expressed as shown in Equation 3. In some embodiments, determining $\eta_{RV}$ may be expressed as shown in Equation 4.

In some embodiments, for the fourth orientation sector $Q_4$, a combination ($F_{m,n}$) of the host vehicle heading angle $\delta_{HV}$ and the remote vehicle heading angle $\delta_{RV}$ may be expressed as shown in Tables 23-25.

TABLE 23

| $F_{m,n}$ | $RV_1$ | $RV_2$ | $RV_3$ | $RV_4$ | $RV_5$ | $RV_6$ |
|---|---|---|---|---|---|---|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 24

| $H_1$ | $\frac{1}{4}\left[\frac{\delta_{HV} - 0 - \sigma}{|\delta_{HV} - 0| + \sigma} + 1\right] \times \left[\frac{\frac{\pi}{2} - \delta_{HV} - \sigma}{\left|\frac{\pi}{2} - \delta_{HV}\right| + \sigma} + 1\right]$ |
|---|---|
| $H_2$ | $\frac{1}{4}\left[\frac{\delta_{HV} - \frac{\pi}{2} - \sigma}{\left|\delta_{HV} - \frac{\pi}{2}\right| + \sigma} + 1\right] \times \left[\frac{(\beta_1 - \pi) - \delta_{HV} - \sigma}{|(\beta_1 - \pi) - \delta_{HV}| + \sigma} + 1\right]$ |
| $H_3$ | $\frac{1}{4}\left[\frac{\delta_{HV} - (\beta_1 - \pi) - \sigma}{|\delta_{HV} - (\beta_1 - \pi)| + \sigma} + 1\right] \times \left[\frac{\pi - \delta_{HV} - \sigma}{|\pi - \delta_{HV}| + \sigma} + 1\right]$ |
| $H_4$ | $\frac{1}{4}\left[\frac{\delta_{HV} - \pi - \sigma}{|\delta_{HV} - \pi| + \sigma} + 1\right] \times \left[\frac{\frac{3\pi}{2} - \delta_{HV} - \sigma}{\left|\frac{3\pi}{2} - \delta_{HV}\right| + \sigma} + 1\right]$ |
| $H_5$ | $\frac{1}{4}\left[\frac{\delta_{HV} - \frac{3\pi}{2} - \sigma}{\left|\delta_{HV} - \frac{3\pi}{2}\right| + \sigma} + 1\right] \times \left[\frac{\beta_1 - \delta_{HV} - \sigma}{|\beta_1 - \delta_{HV}| + \sigma} + 1\right]$ |

TABLE 24-continued

| $H_6$ | $\frac{1}{4}\left[\frac{\delta_{HV} - \beta_1 - \sigma}{|\delta_{HV} - \beta_1| + \sigma} + 1\right] \times \left[\frac{2\pi - \delta_{HV} - \sigma}{|2\pi - \delta_{HV}| + \sigma} + 1\right]$ |
|---|---|

TABLE 25

| $R_1$ | $\frac{1}{4}\left[\frac{\delta_{RV} - 0 - \sigma}{|\delta_{RV} - 0| + \sigma} + 1\right] \times \left[\frac{\frac{\pi}{2} - \delta_{RV} - \sigma}{\left|\frac{\pi}{2} - \delta_{RV}\right| + \sigma} + 1\right]$ |
|---|---|
| $R_2$ | $\frac{1}{4}\left[\frac{\delta_{RV} - \frac{\pi}{2} - \sigma}{\left|\delta_{RV} - \frac{\pi}{2}\right| + \sigma} + 1\right] \times \left[\frac{(\beta_1 - \pi) - \delta_{RV} - \sigma}{|(\beta_1 - \pi) - \delta_{RV}| + \sigma} + 1\right]$ |
| $R_3$ | $\frac{1}{4}\left[\frac{\delta_{RV} - (\beta_1 - \pi) - \sigma}{|\delta_{RV} - (\beta_1 - \pi)| + \sigma} + 1\right] \times \left[\frac{\pi - \delta_{RV} - \sigma}{|\pi - \delta_{RV}| + \sigma} + 1\right]$ |
| $R_4$ | $\frac{1}{4}\left[\frac{\delta_{RV} - \pi - \sigma}{|\delta_{RV} - \pi| + \sigma} + 1\right] \times \left[\frac{\frac{3\pi}{2} - \delta_{RV} - \sigma}{\left|\frac{3\pi}{2} - \delta_{RV}\right| + \sigma} + 1\right]$ |
| $R_5$ | $\frac{1}{4}\left[\frac{\delta_{RV} - \frac{3\pi}{2} - \sigma}{\left|\delta_{RV} - \frac{3\pi}{2}\right| + \sigma} + 1\right] \times \left[\frac{\beta_1 - \delta_{RV} - \sigma}{|\beta_1 - \delta_{RV}| + \sigma} + 1\right] $ |
| $R_6$ | $\frac{1}{4}\left[\frac{\delta_{RV} - \beta_1 - \sigma}{|\delta_{RV} - \beta_1| + \sigma} + 1\right] \times \left[\frac{2\pi - \delta_{RV} - \sigma}{|2\pi - \delta_{RV}| + \sigma} + 1\right]$ |

Some embodiments may include determining, for the fourth orientation sector $Q_4$, a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 26.

TABLE 26

| $\alpha_{HV} =$ | $RV_1$ | $RV_2$ | $RV_3$ | $RV_4$ | $RV_5$ | $RV_6$ |
|---|---|---|---|---|---|---|
| $HV_1$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ |
| $HV_2$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ |
| $HV_3$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_4$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_5$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_6$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |

Some embodiments, for the fourth orientation sector $Q_4$, may include determining a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 27.

TABLE 27

| $\alpha_{RV} =$ | $RV_1$ | $RV_2$ | $RV_3$ | $RV_4$ | $RV_5$ | $RV_6$ |
|---|---|---|---|---|---|---|
| $HV_1$ | $-(\delta_{RV} - \beta_1 + \pi)$ | $-(\delta_{RV} - \beta_1 + \pi)$ | 0 | 0 | 0 | 0 |
| $HV_2$ | 0 | $-(\delta_{RV} - \beta_1 + \pi)$ | 0 | 0 | 0 | 0 |
| $HV_3$ | 0 | 0 | $\delta_{RV} - \beta_1 + \pi$ | 0 | 0 | 0 |
| $HV_4$ | 0 | 0 | $\delta_{RV} - \beta_1 + \pi$ | $\delta_{RV} - \beta_1 + \pi$ | 0 | 0 |
| $HV_5$ | 0 | 0 | $\delta_{RV} - \beta_1 + \pi$ | $\delta_{RV} - \beta_1 + \pi$ | $\delta_{RV} - \beta_1 + \pi$ | 0 |
| $HV_6$ | $-(\delta_{RV} - \beta_1 + \pi)$ | $-(\delta_{RV} - \beta_1 + \pi)$ | 0 | 0 | 0 | $-(\delta_{RV} - \beta_1 - \pi)$ |

Some embodiments, for the fourth orientation sector $Q_4$, may include determining an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 28.

TABLE 28

| $\alpha_D =$ | $RV_1$ | $RV_2$ | $RV_3$ | $RV_4$ | $RV_5$ | $RV_6$ |
|---|---|---|---|---|---|---|
| $HV_1$ | $-(\delta_{HV} - \delta_{RV})$ | $-(\delta_{HV} - \delta_{RV})$ | 0 | 0 | 0 | 0 |
| $HV_2$ | 0 | $-(\delta_{HV} - \delta_{RV})$ | 0 | 0 | 0 | 0 |
| $HV_3$ | 0 | 0 | $\delta_{HV} - \delta_{RV}$ | 0 | 0 | 0 |
| $HV_4$ | 0 | 0 | $\delta_{HV} - \delta_{RV}$ | $\delta_{HV} - \delta_{RV}$ | 0 | 0 |
| $HV_5$ | 0 | 0 | $\delta_{HV} - \delta_{RV}$ | $\delta_{HV} - \delta_{RV}$ | $\delta_{HV} - \delta_{RV}$ | 0 |
| $HV_6$ | $2\pi + (\delta_{HV} - \delta_{RV})$ | $2\pi + (\delta_{HV} - \delta_{RV})$ | 0 | 0 | 0 | $-(\delta_{HV} - \delta_{RV})$ |

In FIG. 12, $L_{HV}$ indicates a distance from the host vehicle to the projected point of convergence with the remote vehicle expected path, and $L_{RV}$ indicates a distance from the remote vehicle to the projected point of convergence with the host vehicle expected path.

In some embodiments, determining the host vehicle approach angle $\alpha_{HV}$, the remote vehicle approach angle $\alpha_{RV}$, and the intersection angle $\alpha_D$ for any combination of orientation sector, host vehicle region, and remote vehicle region may be expressed as the in Equations 5-11:

$$Q_1 = \frac{1}{4}\left[\frac{\phi_{RV} - \phi_{HV} - \sigma}{|\phi_{RV} - \phi_{HV}| + \sigma} + 1\right] \times \left[\frac{\theta_{RV} - \theta_{HV} - \sigma}{|\theta_{RV} - \theta_{HV}| + \sigma} + 1\right]. \quad \text{[Equation 5]}$$

$$Q_2 = \frac{1}{4}\left[\frac{\phi_{HV} - \phi_{RV} - \sigma}{|\phi_{RV} - \phi_{HV}| + \sigma} + 1\right] \times \left[\frac{\theta_{RV} - \theta_{HV} - \sigma}{|\theta_{RV} - \theta_{HV}| + \sigma} + 1\right]. \quad \text{[Equation 6]}$$

$$Q_3 = \frac{1}{4}\left[\frac{\phi_{HV} - \phi_{RV} - \sigma}{|\phi_{RV} - \phi_{HV}| + \sigma} + 1\right] \times \left[\frac{\theta_{HV} - \theta_{RV} - \sigma}{|\theta_{RV} - \theta_{HV}| + \sigma} + 1\right]. \quad \text{[Equation 7]}$$

$$Q_4 = \frac{1}{4}\left[\frac{\phi_{RV} - \phi_{HV} - \sigma}{|\phi_{RV} - \phi_{HV}| + \sigma} + 1\right] \times \left[\frac{\theta_{HV} - \theta_{RV} - \sigma}{|\theta_{RV} - \theta_{HV}| + \sigma} + 1\right]. \quad \text{[Equation 8]}$$

$$\alpha_{HV} = Q_1 \sum_{m=1}^{6}\sum_{n=1}^{6} F\eta\alpha_{HV} + Q_2 \sum_{m=1}^{6}\sum_{n=1}^{6} F\eta\alpha_{HV} + Q_3 \sum_{m=1}^{6}\sum_{n=1}^{6} F\eta\alpha_{HV} + Q_4 \sum_{m=1}^{6}\sum_{n=1}^{6} F\eta\alpha_{HV}. \quad \text{[Equation 9]}$$

$$\alpha_{RV} = Q_1 \sum_{m=1}^{6}\sum_{n=1}^{6} F\eta\alpha_{RV} + Q_2 \sum_{m=1}^{6}\sum_{n=1}^{6} F\eta\alpha_{RV} + Q_3 \sum_{m=1}^{6}\sum_{n=1}^{6} F\eta\alpha_{RV} + Q_4 \sum_{m=1}^{6}\sum_{n=1}^{6} F\eta\alpha_{RV}. \quad \text{[Equation 10]}$$

$$\alpha_D = Q_1 \sum_{m=1}^{6}\sum_{n=1}^{6} F\eta\alpha_D + Q_2 \sum_{m=1}^{6}\sum_{n=1}^{6} F\eta\alpha_D + Q_3 \sum_{m=1}^{6}\sum_{n=1}^{6} F\eta\alpha_D + Q_4 \sum_{m=1}^{6}\sum_{n=1}^{6} F\eta\alpha_D. \quad \text{[Equation 11]}$$

For simplicity and clarity, some notation has been omitted from Equations 9-11. For example, the portion $F\eta\alpha_{HV}$ at the right hand side of Equation 9 may be more expansively recited as follows: $F_{4_{m,n}}\eta_{4_{m,n}}\alpha_{HV4_{m,n}}$.

In some embodiments, the distance from the host vehicle to the intersection ($l_{HV}$) may be determined as shown in the following:

$$\frac{D}{\sin\alpha_D} = \frac{l_{HV}}{\sin\alpha_{RV}} = \frac{l_{RV}}{\sin\alpha_{HV}}; \quad \text{[Equation 12]}$$

-continued $$l_{HV} = D\frac{\sin\alpha_{RV}}{\sin\alpha_D}.$$

Similarly, the distance from the remote vehicle to the intersection ($l_{RV}$) may be determined as shown in the following:

$$\frac{D}{\sin\alpha_D} = \frac{l_{HV}}{\sin\alpha_{RV}} = \frac{l_{RV}}{\sin\alpha_{HV}}; \quad \text{[Equation 13]}$$

$$l_{RV} = D\frac{\sin\alpha_{HV}}{\sin\alpha_D}.$$

Although FIGS. 5-12 show examples of vehicles traveling along straight paths, curved paths or turning paths can be used.

Figure 13:
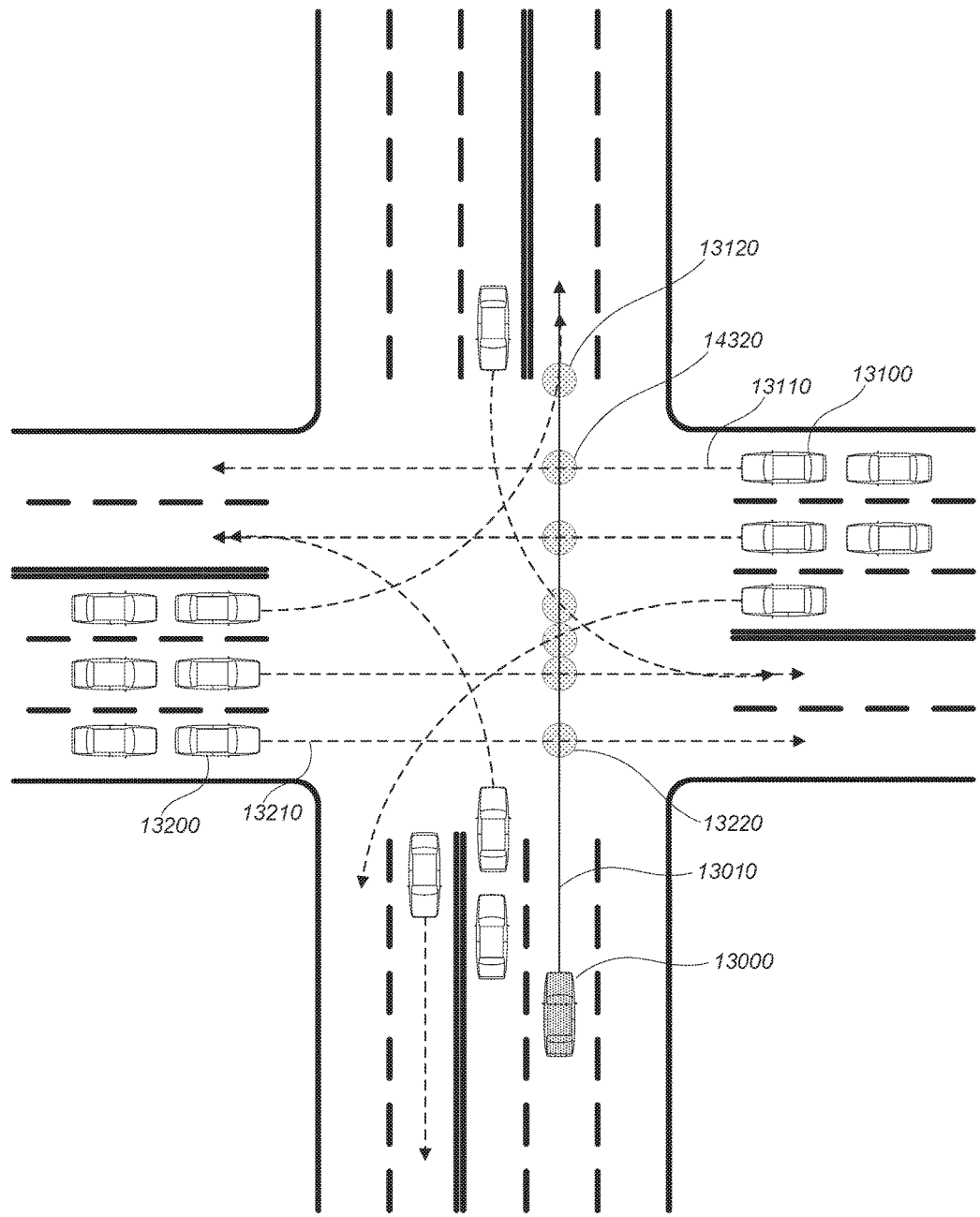
FIG. 13 is a diagram of identifying converging paths.

FIG. 13 is a diagram of identifying converging paths. Identifying converging paths may be implemented in a vehicle, such as the vehicle 1000 shown in FIG. 1 or the vehicles 2100/2110 shown in FIG. 2.

In some embodiments, a host vehicle 13000 may traverse a portion of a vehicle transportation network. The host vehicle may receive remote vehicle messages from multiple remote vehicles 13100/13200 within a defined reception range, identify a host vehicle expected path 13010 for the host vehicle, and identify remote vehicle expected paths 13110/13210 the remote vehicles 13100/13200. In some embodiments, the host vehicle 13000 may determine that one or more of the remote vehicle expected paths 13110/13210 are convergent with the host vehicle expected path 13010. In some embodiments, the host vehicle 13000 may identify a respective expected point of convergence 13120/13220, for one or more of the convergent remote vehicle expected paths 13110/13210.

The converging path methodology described above can be applied to identify the presence of a queue of one or more vehicles that are present ahead of the host vehicle. As used herein, a queue refers to a group of one or more vehicles that are waiting to take an action. Vehicles in a queue may be stopped, or in some situations, moving at a speed that is significantly less than the prevailing speed on the vehicle transportation network. Examples of actions that queued vehicles can be waiting to perform include turning left, turning right, or proceeding straight, as shown with respect to the host vehicle 13000 of FIG. 13.

Figure 14:
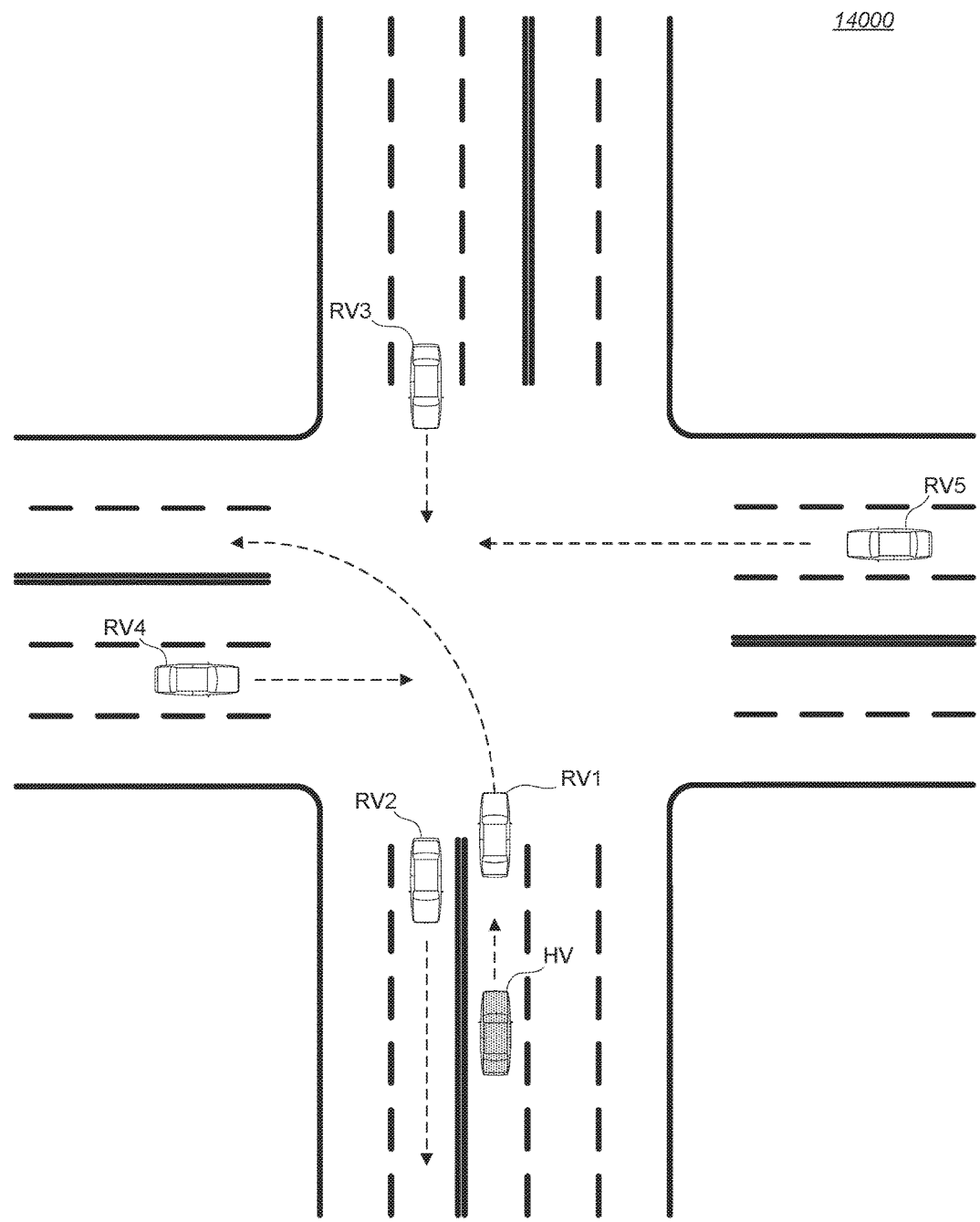
FIG. 14 shows a first scenario in which a one-vehicle queue waiting to turn left is present ahead of a host vehicle at an intersection.

FIG. 14 shows a first scenario in which a one-vehicle queue waiting to turn left is present ahead of a host vehicle HV at an intersection 14000. The host vehicle HV is travelling northbound in a dedicated left turn lane. A one-vehicle queue including a first remote vehicle RV1 is located ahead of the host vehicle HV. The first remote vehicle RV1 is also travelling northbound in the dedicated left turn lane. Accordingly, the host vehicle HV cannot enter the intersection 14000 until the first remote vehicle RV1 has proceeded through the intersection 14000. Several other remote vehicles are also present at the intersection 14000. A second remote vehicle RV2 has passed through the intersection 14000 into the southbound receiving lanes. A third remote vehicle RV3 is travelling southbound and is about to enter the intersection 14000. A fourth remote vehicle RV4 is travelling eastbound on approach to the intersection 14000. A fifth remote vehicle RV5 is travelling westbound on approach to the intersection 14000.

Figure 15:
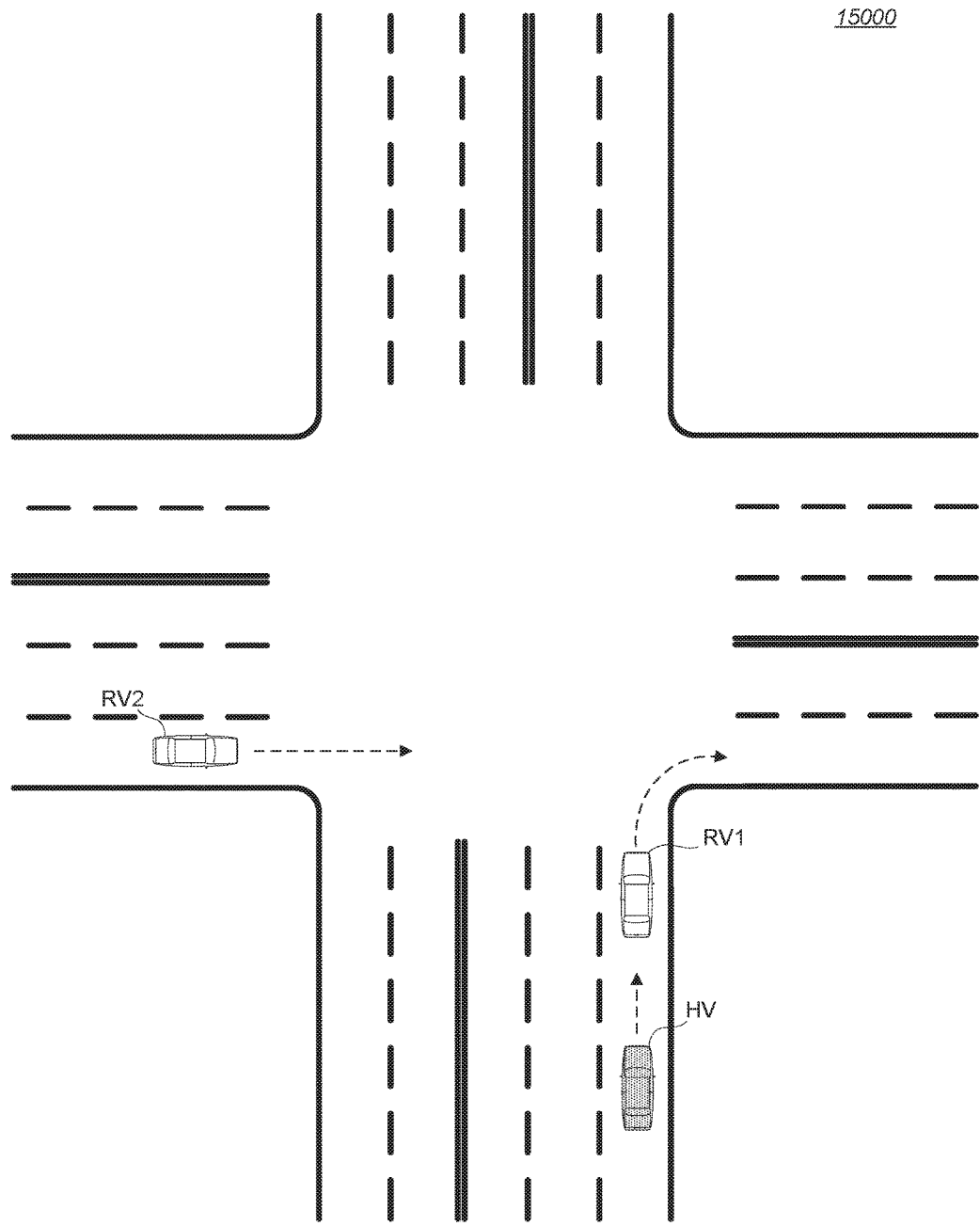
FIG. 15 shows a second scenario in which a one-vehicle queue waiting to turn right is present ahead of a host vehicle at an intersection.

FIG. 15 shows a second scenario in which a one-vehicle queue waiting to turn right is present ahead of a host vehicle HV at an intersection 15000. The host vehicle HV is travelling northbound in the rightmost travel lane. A one vehicle queue including a first remote vehicle RV1 is located in the ahead of the host vehicle HV. The first remote vehicle RV1 is also travelling northbound in the rightmost travel lane. Accordingly, the host vehicle HV cannot enter the intersection 15000 until the first remote vehicle RV1 has proceeded through the intersection 15000. A second remote vehicle RV2 is travelling eastbound and is about to enter the intersection 15000.

Figure 16:
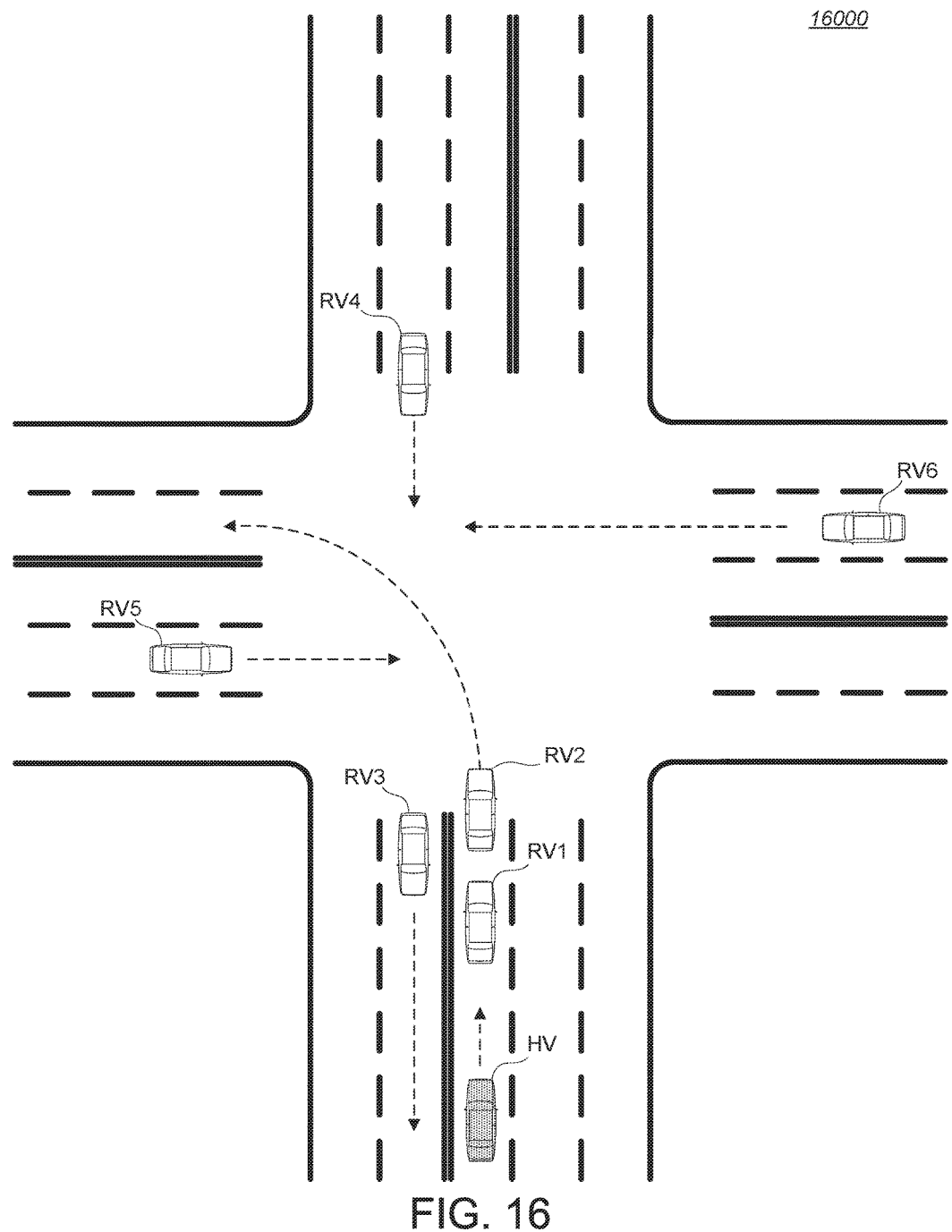
FIG. 16 shows a first scenario in which a two-vehicle queue waiting to turn left is present ahead of a host vehicle at an intersection.

FIG. 16 shows a third scenario in which a two-vehicle queue waiting to turn left is present ahead of a host vehicle HV at an intersection 16000. The host vehicle HV is travelling northbound in a dedicated left turn lane. A two-vehicle queue including a first remote vehicle RV1 and a second remote vehicle RV2 is located ahead of the host vehicle HV. The first remote vehicle RV1 and the second remote vehicle RV2 are also travelling northbound in the dedicated left turn lane. The first remote vehicle RV1 is queued behind the second remote vehicle RV2, which is waiting to enter the intersection. Accordingly, the host vehicle HV cannot enter the intersection 16000 until the second remote vehicle RV2 and the first remote vehicle RV1 have proceeded through the intersection 16000. Several other remote vehicles are also present at the intersection 16000. A third remote vehicle RV3 has passed through the intersection 16000 into the southbound receiving lanes. A fourth remote vehicle RV4 is travelling southbound and is about to enter the intersection 16000. A fifth remote vehicle RV5 is travelling eastbound on approach to the intersection 16000. A sixth remote vehicle RV6 is travelling westbound on approach to the intersection 16000.

Figure 17:
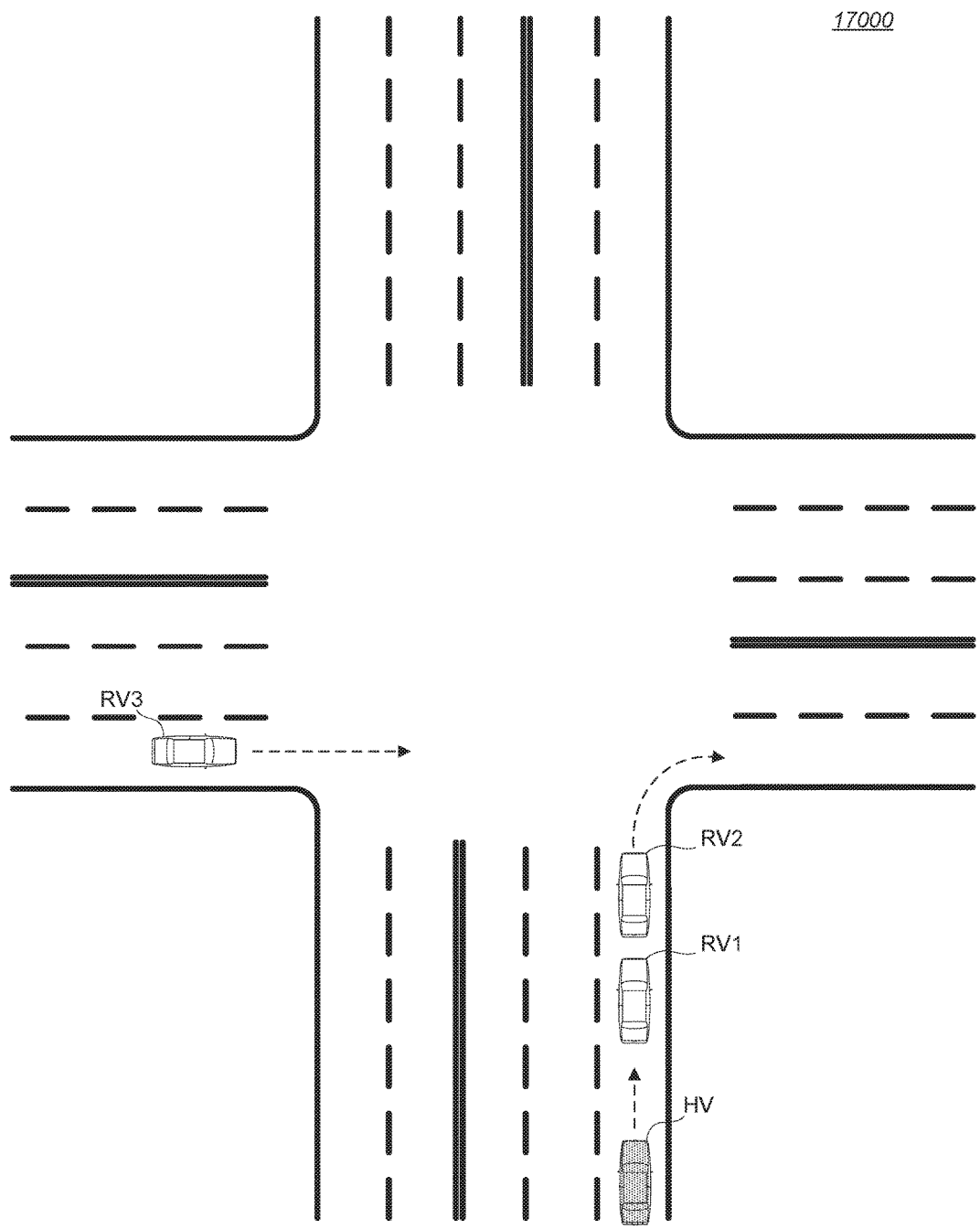
FIG. 17 shows a fourth scenario in which a two-vehicle queue waiting to turn right is present ahead of a host vehicle HV at an intersection.

FIG. 17 shows a fourth scenario in which a two-vehicle queue waiting to turn right is present ahead of a host vehicle HV at an intersection 17000. The host vehicle HV is travelling northbound in the rightmost travel lane. A two-vehicle queue including a first remote vehicle RV1 and a second remote vehicle RV2 is located in the ahead of the host vehicle HV. The first remote vehicle RV1 and the second remote vehicle RV2 are also travelling northbound in the rightmost travel lane. Accordingly, the host vehicle HV cannot enter the intersection 17000 until the first remote vehicle RV1 and the second remote vehicle RV2 have proceeded through the intersection 17000. A third remote vehicle RV3 is travelling eastbound and is about to enter the intersection 17000.

As previously explained, the host vehicle receives remote vehicle information indicating geospatial state and kinematic state for each of the one or more remote vehicles. This can be information such as a basic safety message that is transmitted and received by vehicles via a wireless electronic communication link, such as the direct wireless communication link 2370 of FIG. 2. The host vehicle also identifies its own geospatial state and kinematic state using, for example, the location unit 1310 and the sensor 1360. As examples, the geospatial state for the host vehicle and each of the remote vehicle can include geospatial coordinates, and the kinematic state for the host vehicle and the remote vehicle can include one or more of a heading, a velocity, or a yaw rate.

Using the information received from the remote vehicles, the presence of remote vehicles in a queue ahead of the host vehicle is determined on a vehicle-by-vehicle basis. In the description that follows, presence of a remote vehicle queued ahead of the host vehicle is determined based on the positions of the host vehicle and the remote vehicle. As will be explained subsequently, this can also be applied to determining that two remote vehicles are queued based on information received at the host vehicle from both of the remote vehicles.

For a subject remote vehicle, the host vehicle first determines the convergence angle $\beta_1$ and the distance D along the geodesic defined between the host vehicle and the remote vehicle. The convergence angle $\beta_1$ can be determined in the manner previously described in connection with Equation 1. The distance D can be determined in the manner previously described in connection with Equation 2.

Whether the subject remote vehicle is located in a queue ahead of the host vehicle can be determined by considering one or more factors related to the geospatial states and kinematic states of the host vehicle and subject remote vehicle. For example, the host vehicle can determine that the remote vehicle is located in a queue ahead of the host vehicle when the difference between the host vehicle heading angle $\delta_{HV}$ and the convergence angle $\beta_1$ is within a threshold value $\kappa_T$ and the distance D is less than a threshold distance $\lambda$. This determination can be made using a filtering matrix. The following calculations utilize values including the host vehicle heading angle $\delta_{RV}$ and the remote vehicle heading angle $\delta_{RV}$.

First, the heading difference values $\kappa_{m,n}$ between the host vehicle heading angle $\delta_{HV}$ and the subject remote vehicle heading angle $\delta_{RV}$ are defined as in Table 29.

TABLE 29

| $\kappa_{m,n} =$ | $0 \leq \delta_{RV} < \pi/2$ | $\pi/2 \leq \delta_{RV} < \pi$ | $\pi \leq \delta_{RV} < 3\pi/2$ | $3\pi/2 \leq \delta_{RV} < 2\pi$ |
|---|---|---|---|---|
| $0 \leq \delta_{HV} < \pi/2$ | $\|\delta_{HV} - \delta_{RV}\|$ | 0 | 0 | $2\pi + \|\delta_{HV} - \delta_{RV}\|$ |
| $\pi/2 \leq \delta_{HV} < \pi$ | 0 | $\|\delta_{HV} - \delta_{RV}\|$ | 0 | 0 |
| $\pi \leq \delta_{HV} < 3\pi/2$ | 0 | 0 | $\|\delta_{HV} - \delta_{RV}\|$ | 0 |
| $3\pi/2 \leq \delta_{HV} < 2\pi$ | $2\pi + \|\delta_{RV} - \delta_{HV}\|$ | 0 | 0 | $\|\delta_{HV} - \delta_{RV}\|$ |

Next, the filtering matrix shown in Table 30 is constructed using the expressions shown in Table 31 and Table 32.

TABLE 30

| $F_{m,n} =$ | $R_1$ | $R_2$ | $R_3$ | $R_4$ |
|---|---|---|---|---|
| $H_1$ | $H_1 \times R_1$ | $H_1 \times R_2$ | $H_1 \times R_3$ | $H_1 \times R_4$ |
| $H_2$ | $H_2 \times R_1$ | $H_2 \times R_2$ | $H_2 \times R_3$ | $H_2 \times R_4$ |
| $H_3$ | $H_3 \times R_1$ | $H_3 \times R_2$ | $H_3 \times R_3$ | $H_3 \times R_4$ |
| $H_4$ | $H_4 \times R_1$ | $H_4 \times R_2$ | $H_4 \times R_3$ | $H_4 \times R_4$ |

TABLE 31

| | |
|---|---|
| $H_1$ | $\frac{1}{4}\left[\frac{\delta_{HV}-0+\sigma}{\|\delta_{HV}-0\|+\sigma}+1\right]\times\left[\frac{\frac{\pi}{2}-\delta_{HV}-\sigma}{\|\frac{\pi}{2}-\delta_{HV}\|+\sigma}+1\right]$ |
| $H_2$ | $\frac{1}{4}\left[\frac{\delta_{HV}-\frac{\pi}{2}+\sigma}{\|\delta_{HV}-\frac{\pi}{2}\|+\sigma}+1\right]\times\left[\frac{\pi-\delta_{HV}-\sigma}{\|\pi-\delta_{HV}\|+\sigma}+1\right]$ |
| $H_3$ | $\frac{1}{4}\left[\frac{\delta_{HV}-\pi+\sigma}{\|\delta_{HV}-\pi\|+\sigma}+1\right]\times\left[\frac{\frac{3\pi}{2}-\delta_{HV}-\sigma}{\|\frac{3\pi}{2}-\delta_{HV}\|+\sigma}+1\right]$ |
| $H_4$ | $\frac{1}{4}\left[\frac{\delta_{HV}-\frac{3\pi}{2}+\sigma}{\|\delta_{HV}-\frac{3\pi}{2}\|+\sigma}+1\right]\times\left[\frac{2\pi-\delta_{HV}-\sigma}{\|2\pi-\delta_{HV}\|+\sigma}+1\right]$ |

TABLE 32

| | |
|---|---|
| $R_1$ | $\frac{1}{4}\left[\frac{\delta_{RV}-0+\sigma}{\|\delta_{RV}-0\|+\sigma}+1\right]\times\left[\frac{\frac{\pi}{2}-\delta_{RV}-\sigma}{\|\frac{\pi}{2}-\delta_{RV}\|+\sigma}+1\right]$ |
| $R_2$ | $\frac{1}{4}\left[\frac{\delta_{RV}-\frac{\pi}{2}+\sigma}{\|\delta_{RV}-\frac{\pi}{2}\|+\sigma}+1\right]\times\left[\frac{\pi-\delta_{RV}-\sigma}{\|\pi-\delta_{RV}\|+\sigma}+1\right]$ |
| $R_3$ | $\frac{1}{4}\left[\frac{\delta_{RV}-\pi+\sigma}{\|\delta_{RV}-\pi\|+\sigma}+1\right]\times\left[\frac{\frac{3\pi}{2}-\delta_{RV}-\sigma}{\|\frac{3\pi}{2}-\delta_{RV}\|+\sigma}+1\right]$ |
| $R_4$ | $\frac{1}{4}\left[\frac{\delta_{RV}-\frac{3\pi}{2}+\sigma}{\|\delta_{RV}-\frac{3\pi}{2}\|+\sigma}+1\right]\times\left[\frac{2\pi-\delta_{RV}-\sigma}{\|2\pi-\delta_{RV}\|+\sigma}+1\right]$ |

To filter out irrelevant values, the heading difference values $\kappa_{m,n}$ are multiplied by the filter matrix values $F_{m,n}$. This can be done as shown in Table 33.

TABLE 33

| $\kappa$ | | | |
|---|---|---|---|
| $\kappa_{1,1} \times F_{1,1}$ | $\kappa_{1,2} \times F_{1,2}$ | $\kappa_{1,3} \times F_{1,3}$ | $\kappa_{1,4} \times F_{1,4}$ |
| $\kappa_{2,1} \times F_{2,1}$ | $\kappa_{2,2} \times F_{2,2}$ | $\kappa_{2,3} \times F_{2,3}$ | $\kappa_{2,4} \times F_{2,4}$ |
| $\kappa_{3,1} \times F_{3,1}$ | $\kappa_{3,2} \times F_{3,2}$ | $\kappa_{3,3} \times F_{3,3}$ | $\kappa_{3,4} \times F_{3,4}$ |
| $\kappa_{4,1} \times F_{4,1}$ | $\kappa_{4,2} \times F_{4,2}$ | $\kappa_{4,3} \times F_{4,3}$ | $\kappa_{4,4} \times F_{4,4}$ |

A heading difference angle $\kappa$ is next calculated as the sum of the filtered values represented in Table 33. This summation is represented in Equation 13.

$$\kappa = \sum_{m=1}^{4}\sum_{n=1}^{4} \kappa_{m,n} \times F_{m,n} \quad \text{[Equation 14]}$$

The heading difference angle and the distance D are compared to threshold values to determine whether the subject remote vehicle is present in a queue that is located ahead of the host vehicle. This threshold can be computed as shown in Equation 14.

$$P_{RV_1} = \frac{1}{4}\left[\frac{\kappa_T-\kappa-\sigma}{|\kappa_T-\kappa|+\sigma}+1\right]\times\left[\frac{\lambda-D-\sigma}{|\lambda-D|+\sigma}+1\right] \quad \text{[Equation 15]}$$

In Equation 14, $P_{RV_1}$ is a value that represents whether the subject remote vehicle is present in a queue ahead of the host vehicle. If $P_{RV_1}=1$, this signifies that the subject remote vehicle is present in a queue ahead of the host vehicle. Otherwise, it is determined that the subject remote vehicle is not present in a queue ahead of the host vehicle. In Equation 14, the heading difference angle $\kappa$ is the difference between the heading angles of two consecutive vehicles, such as the subject remote vehicle and the host vehicle, a heading angle threshold value $\kappa_T$ is a threshold angular value, such as 0.1 radian, D is the distance between two consecutive vehicles such as the subject remote vehicle and the host vehicle, $\lambda$ is a threshold distance value such as 10 meters, and $\sigma$ is a small value used to avoid dividing by zero, where $\sigma \ll 1$.

The example calculation described above with respect to Tables 29-33 and Equations 13-14 determines whether the subject remote vehicle is present in a queue ahead of the host vehicle. If $P_{RV_1}=1$, the subject remote vehicle is considered to be in a queue ahead of the host vehicle. This confirms that there is at least one remote vehicle present in a queue ahead of the host vehicle.

Determining whether additional vehicles are present in the queue ahead of the host vehicle can be performed using the calculations described above in at least two different ways. The result in each of these implementations is a determination as to whether or not there is a queue having a length of two or more vehicles ahead of the host vehicle. The determination can include information identifying the number of vehicles present in the queue. The number can, however, be capped at a predetermined number, because the system may be configured to stop identifying additional vehicles in the queue once the predetermined number of vehicles has been identified. For example, once a queue length of three vehicles has been identified, the system could cease attempting to identify additional vehicles in the queue.

In a first implementation, the presence of a second or subsequent vehicle ahead of the host vehicle in the queue is determined by performing additional iterations of the calculations described above with respect to Tables 29-33 and Equations 13-14 using pairs of remote vehicles. As an example, consider a determination made in the context of the third scenario of FIG. 16. In a first iteration input values from the host vehicle HV and the first remote vehicle RV1 show that the first remote vehicle RV1 is present in a queue ahead of the host vehicle HV. Subsequent iterations of the determination consider whether any of the other remote vehicles RV2-RV6 are present in a queue ahead of the first remote vehicle RV1. When evaluated using information corresponding to the first remote vehicle RV1 and the second remote vehicle RV2, Equation 14 evaluates as $P_{RV=1}$, showing that RV2 is present in a queue ahead of RV1. Based on this, it is determined that the queue ahead of the host vehicle HV includes both the first remote vehicle RV1 and the second remote vehicle RV2. In the first implementation, the heading angle threshold value $\kappa_T$ and the distance threshold value $\lambda$ are set to detect consecutive vehicles, and these thresholds do not need to be changed in subsequent iterations. In a second implementation, the presence of a second or subsequent vehicle ahead of the host vehicle in the queue is determined by performing additional iterations of the calculations described above with respect to Tables 29-33 and Equations 13-14 using information representing the host vehicle and the remote vehicle in question. Because the measurements in this implementation are always based on the location and heading of the host vehicle HV, the heading angle threshold value $\kappa_T$ and the distance threshold value $\lambda$ are increased with each iteration because the remote vehicle being analyzed will be separated from the host vehicle by one or more previously identified remote vehicles. Thus, after a remote vehicle such as the first remote vehicle RV1 of FIG. 16 is identified ahead of the host vehicle HV the thresholds are increased in the subsequent iteration, such as when evaluating $P_{RV}$ using information for the host vehicle HV and the second remote vehicle RV2 of FIG. 16.

The number of vehicles present in a queue ahead of the host vehicle can be utilized to suppress potential false alarm alerts in a vehicle warning system, which can be implemented, for example, by the controller 1300 of the vehicle 1000. The vehicle warning system can output at least two types of alerts. The first type of alert is referred to as an informative alert, and the second type of alert is referred to as a warning alert. The informative alert is intended to make the driver of the host vehicle aware of the presence of a potentially conflicting vehicle in the vicinity of the host vehicle under circumstances that do not imply a need for immediate action or attention on the part of the driver. The warning alert is intended to indicate to the driver that immediate action may be necessary to avoid a collision. Immediate action can include maneuvering the host vehicle to avoid a potential collision or maintaining the position of the host vehicle, such as by waiting before proceeding through an intersection.

The warning alert and the informative alert can each be a visible or audible alert that is output by the controller 1300 using, for example, the user interface 1350. The warning alert or informative alert can be output using at least one of an audio output device or a visual output device that is incorporated in the user interface. The audible and or visual content of the warning alert and the informative alert are each calibrated to reflect a respective level of urgency, with the warning alert having an audible or visual character that conveys a greater sense of urgency than the audible or visual character that is conveyed by the informational alert.

Upon identifying at least one of the one or more remote vehicles as a conflicting vehicle, a time-to-contact is determined based on the remote vehicle information corresponding to the conflicting vehicle and the host vehicle information. Time-to-contact is an estimate of the amount of time that will pass before two vehicles collide if they maintain their current or anticipated trajectories. Time-to-contact can be estimated based on the current speed and trajectory for each of the vehicles. In some implementations, time-to-contact is measured based on the location of the vehicles relative to a convergence point. In these implementations, the time-to-contact can be calculated based on the anticipated travel time for either or both vehicles to reach the convergence point.

Based on the time-to-contact, the vehicle warning system determines whether an alert should be triggered. If the time-to-contact is less than a warning alert threshold, a warning alert is triggered. If the time-to-contact is greater than the warning alert threshold but less than an informative alert threshold, an informative alert is triggered. If the time-to-contact is greater than the informative alert threshold, no alert is triggered. The warning alert threshold is less than the informative alert threshold. As an example, the warning alert threshold could be three seconds and the informative alert threshold could be seven seconds.

When a warning alert or an informative alert is triggered, the vehicle warning system can apply false alarm suppression based on the number of vehicles present in a queue ahead of the host vehicle. For example, if there are no vehicles present in a queue ahead of the host vehicle (i.e. queue length equals zero), the vehicle warning system causes the informative alert or warning alert to be audibly or visibly output with no suppression. If the queue length is one or more vehicles, the informative alert or warning alert can be suppressed (i.e. not audibly or visibly output). In some implementations, when a warning alert is suppressed, an informative alert is visually or audibly output in lieu of the warning alert.

Figure 18:
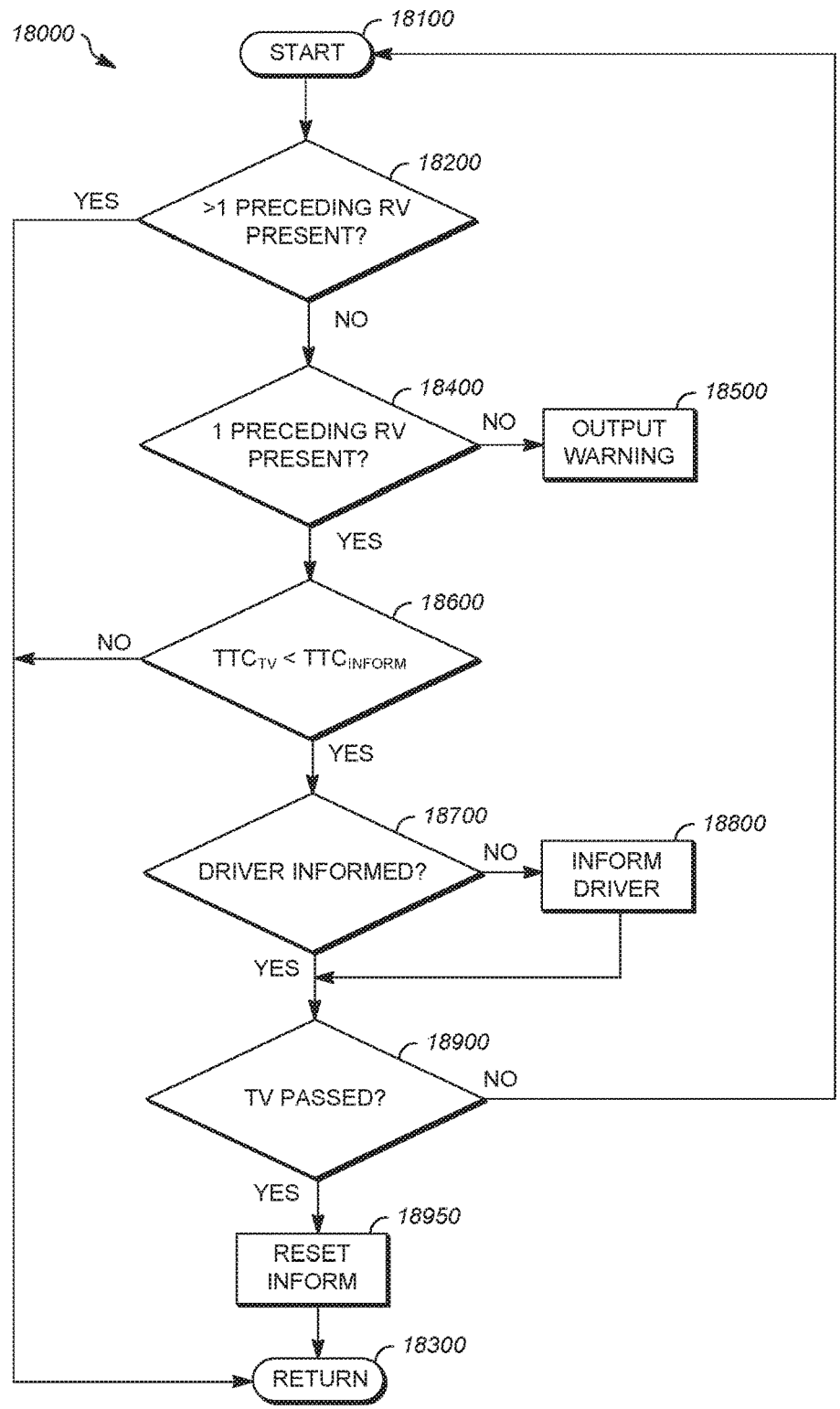
FIG. 18 is a flowchart that shows a false alarm suppression method.

FIG. 18 is a flowchart that shows a false alarm suppression method 18000 that can be implemented in a vehicle, such as the vehicle 1000 shown in FIG. 1 or the vehicles 2100/2110 shown in FIG. 2. In particular, the false alarm suppression method can be performed by the controller 1300 of the vehicle 1000 by storing instructions at the memory 1340 that, when executed by the processor 1330 cause the false alarm suppression method 18000 to be performed including causing or preventing output of alerts at the user interface 1350.

The method 18000 can be performed when an alert is triggered by the false alarm suppression system. The method 18000 can continue until the alert is ended by the false alarm suppression system. The alert is made in response to a determination that there is a potentially conflicting vehicle, which is referred to herein as a threat vehicle TV, near a host vehicle HV. As previously noted, the warning system may be implemented in the form of instructions stored in the memory 1340 that are executed by the processor 1330 and cause output of visible or audible signals.

A number of remote vehicles present in a queue ahead of the host vehicle HV is calculated as previously discussed and is provided as an input to the method 18000 when the alert is triggered. The method 18000 begins at a start block 18100 and proceeds to operation 18200. In operation 18200, if more than one preceding remote vehicle is present in the queue ahead of the host vehicle HV, the process proceeds to a return block 18300, and the process returns to the start block 18100. If the number of preceding vehicles present in the queue ahead of the host vehicle is not greater than one, the method proceeds to operation 18400.

At operation 18400, a determination is made as to whether exactly one preceding remote vehicle is present in the queue ahead of the host vehicle HV. If exactly one preceding remote vehicle is not present in the queue ahead of the host vehicle HV (e.g. zero vehicles are present in the queue ahead of the host vehicle HV), the method proceeds to operation 18500. At operation 18500, no suppression is applied and the warning alert is visibly or audibly output, such as by the user interface 1350 of the vehicle 1000. If exactly one remote vehicle is present in the queue ahead of the host vehicle HV, the process proceeds to operation 18600.

At operation 18600, a time-to-contact $TTC_{TV}$ is computed or obtained for the host vehicle HV relative to the threat vehicle TV, and is compared to the informative alert threshold $TTC_{inform}$. If the time-to-contact $TTC_{TV}$ is greater than the informative alert threshold $TTC_{inform}$, the process proceeds to the return block 18300. If the time-to-contact $TTC_{TV}$ is less than the informative alert threshold $TTC_{inform}$, the process proceeds to operation 18700.

At operation 18700, if the driver is currently being informed by way of an active informational alert, the process proceeds to operation 18900. Otherwise, the process proceeds to operation 18800, where the informative alert is visibly or audibly output. Thus, for example, the informative alert can output in lieu of a warning alert when there is a queue of exactly one vehicle ahead of the host vehicle HV. The process then proceeds to operation 18900.

In operation 18900 a determination is made as to whether the threat vehicle TV has passed the convergence point. If the threat vehicle TV has not passed the convergence point, the process returns to the start block 18100. If the threat vehicle has passed the convergence point, the process proceeds to operation 18950, where the informative alert is reset, such that it is no longer visibly or audibly output. The process then proceeds to the return block 18300.

Persons of skill in the art will understand that adjustments can be made to the process 18000. For example, the number of vehicles used in the determinations made in operations 18200 and 18400 can be modified.

For the foregoing it will be appreciated that, in some implementations, no warning alert is output if the queue length is equal to or greater than one vehicle. In some implementations an informative alert is output if the time-to-contact is less than an informative alert threshold, the time-to-contact is greater than the warning alert threshold, and only if the queue length is equal to or less than one vehicle. In some implementations, an informative alert is output if the time-to-contact is less than the warning alert threshold, and only if the queue length is equal to one vehicle.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for providing information to a driver of a vehicle, comprising:

obtaining information that describes a queue of stopped vehicles that are waiting to traverse a first path, wherein the queue of stopped vehicles includes a host vehicle;

obtaining conflicting vehicle information that describes a second path to be traversed by a potentially conflicting vehicle, wherein the second path crosses the first path at a convergence point;

determining a queue length representing a number of vehicles from the queue of stopped vehicles that are located ahead of the host vehicle;

determining an anticipated travel time for travel of the potentially conflicting vehicle to the convergence point; and causing a warning alert to be output if the anticipated travel time for travel of the potentially conflicting vehicle to the convergence point is less than a warning alert time value and only if the queue length is equal to or less than a warning alert length value.

2. The method of claim 1, wherein the conflicting vehicle information includes information indicating a geospatial state and a kinematic state for the potentially conflicting vehicle.

3. The method of claim 2, wherein the conflicting vehicle information is received at the host vehicle from the potentially conflicting vehicle.

4. The method of claim 2, wherein the geospatial state for the potentially conflicting vehicle includes geospatial coordinates.

5. The method of claim 2, wherein the kinematic state for the potentially conflicting vehicle includes at least one of a heading, a velocity, or a yaw rate.

6. The method of claim 1, wherein determining the queue length is performed using information indicating geospatial state and kinematic state for queued vehicles from the queue of stopped vehicles.

7. The method of claim 6, wherein the information indicating geospatial state and kinematic state for the queued vehicles is received at the host vehicle from the queued vehicles.

8. The method of claim 1, wherein the warning alert length value is zero.

9. The method of claim 1, further comprising:

causing an informative alert to be output if the anticipated travel time for travel of the potentially conflicting vehicle to the convergence point is less than an informative alert time value, the anticipated travel time for travel of the potentially conflicting vehicle to the convergence point is greater than the warning alert time value, and only if the queue length is equal to or less than an informative alert length value.

10. A system, comprising:

a wireless electronic communication device that is located in a host vehicle;

one or more sensors that are located in the host vehicle;

an output system that is located in the host vehicle and includes at least one of an audio output device or a visual output device; and an information system that is located in the host vehicle and is operable to execute instructions that cause the information system to:

obtain information from the one or more sensors, wherein the information describes a queue of stopped vehicles that are waiting to traverse a first path, wherein the queue of stopped vehicles includes the host vehicle, obtain conflicting vehicle information that describes a second path to be traversed by a potentially conflicting vehicle, wherein the second path crosses the first path at a convergence point, determine a queue length representing a number of vehicles from the queue of stopped vehicles that are located ahead of the host vehicle, determine an anticipated travel time for travel of the potentially conflicting vehicle to the convergence point, and cause a warning alert to be output using the output system if the anticipated travel time for travel of the potentially conflicting vehicle to the convergence point is less than a warning alert time value and only if the queue length is equal to or less than a warning alert length value.

11. The system of claim 10, wherein the conflicting vehicle information includes information indicating a geospatial state and a kinematic state for the potentially conflicting vehicle.

12. The system of claim 11, wherein the conflicting vehicle information is received at the host vehicle from the potentially conflicting vehicle.

13. The system of claim 11, wherein the geospatial state for the potentially conflicting vehicle includes geospatial coordinates.

14. The system of claim 11, wherein the kinematic state for the potentially conflicting vehicle includes at least one of a heading, a velocity, or a yaw rate.

15. The system of claim 10, wherein the queue length is determined using information indicating geospatial state and kinematic state for queued vehicles from the queue of stopped vehicles.

16. The system of claim 15, wherein the information indicating geospatial state and kinematic state for the queued vehicles is received at the host vehicle from the queued vehicles.

17. The system of claim 10, wherein the warning alert length value is zero.

18. The system of claim 10, wherein the instructions further cause the information system to:

cause an informative alert to be output if the anticipated travel time for travel of the potentially conflicting vehicle to the convergence point is less than an informative alert time value, the anticipated travel time for travel of the potentially conflicting vehicle to the convergence point is greater than the warning alert time value, and only if the queue length is equal to or less than an informative alert length value.

19. A system, comprising:

a host vehicle that includes a wireless electronic communication device, one or more sensors that output host vehicle information, an output system that includes at least one of an audio output device or a visual output device, and an information system that is operable to execute instructions that cause the information system to:

determine, based on the host vehicle information, that the host vehicle is waiting in a queue of stopped vehicles to follow a first path through a roadway intersection, determine, based on remote vehicle information obtained from remote vehicles, that a potentially conflicting vehicle will cross the first path at a convergence point, determine an anticipated travel time for travel of the potentially conflicting vehicle to the convergence point, and cause a warning alert to be output using the output system if the anticipated travel time for travel of the potentially conflicting vehicle to the convergence point is less than a warning alert time value and only if zero vehicles are present ahead of the host vehicle in the queue of stopped vehicles.

20. The system of claim 19, wherein the instructions further cause the information system to:

cause an informative alert to be output using the output system if the anticipated travel time for travel of the potentially conflicting vehicle to the convergence point is less than a warning alert time value and if one or more vehicles are queued ahead of the host vehicle.

* * * * *